(12) United States Patent
Kang et al.

(10) Patent No.: US 12,494,812 B2
(45) Date of Patent: Dec. 9, 2025

(54) ELECTRONIC DEVICE INCLUDING MAGNETS

(71) Applicant: Samsung Electronics Co., Ltd., Gyeonggi-do (KR)

(72) Inventors: Hyosung Kang, Gyeonggi-do (KR); Jungbae Park, Gyeonggi-do (KR); Haewon Sung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 18/077,426

(22) Filed: Dec. 8, 2022

(65) Prior Publication Data

US 2023/0105902 A1    Apr. 6, 2023

Related U.S. Application Data

(63) Continuation of application No. PCT/KR2022/007470, filed on May 26, 2022.

(30) Foreign Application Priority Data

Jun. 3, 2021    (KR) .................... 10-2021-0072184

(51) Int. Cl.
*H04B 1/00* (2006.01)
*H04B 1/3888* (2015.01)
*H04M 1/02* (2006.01)

(52) U.S. Cl.
CPC ........ *H04B 1/3888* (2013.01); *H04M 1/0216* (2013.01)

(58) Field of Classification Search
CPC .......................... H04B 1/3888; H04M 1/0216; H04M 1/0214; G06F 1/16; G06F 1/1679; G06F 1/1616; G06F 1/1628; G06F 1/166
See application file for complete search history.

(56) References Cited

U.S. PATENT DOCUMENTS

| 7,775,567 | B2 | 8/2010 | Ligtenberg et al. |
| 8,947,874 | B2 | 2/2015 | Andre et al. |

(Continued)

FOREIGN PATENT DOCUMENTS

| KR | 10-1709570 B1 | 3/2017 |
| KR | 10-1936987 B1 | 1/2019 |

(Continued)

*Primary Examiner* — Md K Talukder
(74) *Attorney, Agent, or Firm* — Cha & Reiter, LLC

(57) ABSTRACT

An electronic device including a first housing and second housing that are movable relative to one another such that the electronic device is transitionable between an open state and a closed state. The second housing includes first and second cover surfaces. In the open state, the first surface of the first housing may be visually exposed to an outside and in the closed state, the first cover surface may face the first surface and visually occludes the first housing surface. A first magnetic body may be disposed inside the first housing and may be positioned between the second surface and the display. A second magnetic body between the first and second cover surfaces may be positioned at a position to effect magnetic coupling of the first and second magnetic bodies in the closed state. A support coupling the second surface and the first magnetic body may be transitionable between shortened and expanded lengths.

20 Claims, 22 Drawing Sheets

(56) References Cited

U.S. PATENT DOCUMENTS

| | | |
|---|---|---|
| 10,672,548 B2 | 6/2020 | Srinivasan et al. |
| 2007/0138806 A1 | 6/2007 | Ligtenberg et al. |
| 2013/0329359 A1 | 12/2013 | Andre et al. |
| 2016/0323002 A1* | 11/2016 | Cho .................. H04B 1/3888 |
| 2017/0083049 A1* | 3/2017 | Kim .................. G06F 1/1679 |
| 2019/0164675 A1 | 5/2019 | Srinivasan et al. |
| 2020/0013531 A1 | 1/2020 | Tazbaz et al. |
| 2020/0352046 A1* | 11/2020 | Kim .................. H04M 1/0268 |
| 2021/0018962 A1 | 1/2021 | de la Fuente |
| 2021/0034102 A1* | 2/2021 | Cho .................. H01F 7/0226 |
| 2021/0157363 A1* | 5/2021 | Wang ................ G06F 1/1626 |
| 2021/0232234 A1* | 7/2021 | Morrison .......... G06F 1/1681 |
| 2021/0341972 A1* | 11/2021 | Togashi ............. G06F 1/1652 |
| 2023/0105902 A1* | 4/2023 | Kang ................. H04B 1/3888 |
| | | 455/575.8 |

FOREIGN PATENT DOCUMENTS

| | | |
|---|---|---|
| KR | 10-2019-0043826 A | 4/2019 |
| KR | 10-2020-0067023 A | 6/2020 |
| KR | 10-2020-0127744 A | 11/2020 |
| KR | 10-2021-0015468 A | 2/2021 |

* cited by examiner

ELECTRONIC DEVICE INCLUDING MAGNETS

CROSS-REFERENCE TO RELATED APPLICATIONS

This application is a continuation of International Application No. PCT/KR2022/007470 designating the United States, filed on May 26, 2022, in the Korean Intellectual Property Receiving Office and claims priority to Korean Patent Application No. 10-2021-0072184, filed on Jun. 3, 2021, in the Korean Intellectual Property Office, the disclosures of which are incorporated by reference herein in their entireties.

BACKGROUND

1. Field

The disclosure relates to an electronic device including magnets.

2. Description of Related Art

An electronic device such as a tablet personal computer (PC), a notebook computer, or a foldable phone may control an ON/OFF operation of a display through an operation of closing the display. For example, in the case of a tablet PC, an operation of closing a display may be performed through a cover, and in the case of a foldable phone, a display may be closed by folding the display through a hinge structure. In this case, magnetics may be used in the electronic device to maintain the display closed.

A folded state of an electronic device may be maintained through magnets embedded therein, and the magnetic force of the magnets may be weakened by heat of the electronic device or an external impact, causing the electronic device to be unfolded. Accordingly, there is a need for preventing a malfunction of the electronic device by firmly maintaining the folded state of the electronic device. In general, an electronic device may operate to turn off a display in a folded state. Thus, there is a need for designing a mounting structure for magnets to secure a sufficiently strong attaching force to prevent battery consumption according to a malfunction of the display. In addition, when the magnets are disposed on the rear surface of the display, it is necessary to adjust the pressing force of the magnets applied to the display to prevent the magnets from damaging the display.

The above information is presented as background information only to assist with an understanding of the present disclosure. No determination has been made, and no assertion is made, as to whether any of the above might be applicable as prior art with regard to present disclosure.

SUMMARY

According to certain embodiments of the disclosure, the attaching force between a structure (e.g., a cover and a housing) covering the display and the magnets may be enhanced or maximized by omitting a structure between the display and the magnets and causing the magnets to contact the rear surface of the display.

According to certain embodiments of the disclosure, it is possible to prevent the magnets from damaging the display by adjusting the distance between the magnets and the display through supports to allow the magnets to contact the display only in a process of closing the display.

The technical goals to be achieved through embodiments of the disclosure are not limited to those described above, and other technical goals not mentioned above are clearly understood by one of ordinary skill in the art from the following description.

In accordance with an aspect of the disclosure, an electronic device, may include a first housing comprising a first surface and a second surface, a second housing comprising a first cover surface and a second cover surface, the second housing coupled to the first housing, the first housing and the second housing being movable relative to one another such that the electronic device is transitionable between an open state in which the first surface is visually exposed to an outside and a closed state in which the first cover surface is disposed to face the first surface and visually occlude the first surface, a display exposed through the first surface, a first magnetic body disposed inside the first housing and is positioned between the second surface and the display, a second magnetic body disposed between the first cover surface and the second cover surface and is positioned at a position to effect magnetic coupling of the first magnetic body to the second magnetic body in the closed state, and a support coupling the second surface and the first magnetic body, the support having a length in a connection direction from the second surface to the first housing surface, the length being transitionable between a first length and a second length, the first magnetic body may be disposed to face a rear surface of the display and a distance from the first magnetic body to the rear surface of the display is adjusted by the support.

In the open state, the support causes the first magnetic body to be spaced apart from the rear surface of the display such that the first magnetic body is uncoupled from the rear surface. In the closed state, when an attractive force acts between the first magnetic body and the second magnetic body, the length of the support in the connection direction increases such that the first magnetic body contacts the rear surface of the display. The support may be formed of a compressible elastic material. The support may include one or more hollows penetrating in a direction perpendicular to the connection direction.

In an embodiment, the support may also include a base disposed on the second surface, a support plate spaced apart from the base in the connection direction and connected to the first magnetic body, and a connector connecting the base and the support plate such that a distance between the base and the support plate is adjusted. The support may include a shape memory alloy whose length in the connection direction changes according to temperature. The support may have a first length at a first temperature and has a second length longer than the first length at a second temperature lower than the first temperature, the first magnetic body contacting the rear surface of the display when the support is at the second length. The second housing may also include a damper member protruding outward from the first cover surface to contact the display in the closed state, and the second magnetic body may be disposed inside the damper member.

In an embodiment, a pressing member may be disposed inside the second housing and configured to press the damper member toward of the first cover surface. A plurality of first magnetic bodies overlap the display in a state in which the first housing surface is viewed, and a plurality of second magnetic bodies may be provided at positions corresponding to the plurality of first magnetic bodies, respectively, in the closed state such that the first plurality of first magnetic bodies are respectively coupled to the second plurality of second magnetic bodies. At least one first magnetic body of the plurality of first magnetic bodies and at least one second magnetic body of the plurality of second magnetic bodies may be disposed at corresponding to positions to apply a repulsive force to each other. The second housing may include a keyboard disposed on the first cover surface. The display may include a first area exposed through the first surface and a second area exposed through the first cover surface, and the second magnetic body may be disposed inside the second housing to face a rear surface of the second area, and a distance from the second magnetic body to the second area is adjusted according to a magnetic force acting thereon. A second support connected to the second magnetic body, the second support whose length in a second connection direction from the second cover surface to the first cover surface is adjusted, and the second support may cause the second magnetic body to be spaced apart from the rear surface of the second area in the open state, and causes the second magnetic body to contact the rear surface of the second area in the closed state.

In accordance with an aspect of the disclosure, an electronic device may include a display comprising a first area and a second area; a first housing connected to a rear surface of the first area and forming a first space; a second housing connected to a rear surface of the second area and forming a second space; a hinge structure foldably connecting the first housing and the second housing, the hinge structure configured to cause the electronic device to be in an open state in which the first area and the second area are visually exposed to an outside and a close state in which the first area and the second area substantially face each other; a first magnetic body disposed in the first space to face the rear surface of the first area; a second magnetic body disposed in the second space to face the rear surface of the second area; a first support disposed in the first space to support the first magnetic body, the first support whose length in a first connection direction toward the first area change, and a second support disposed in the second space to support the second magnetic body, the second support whose length in a second connection direction toward the second area change. A distance between the first magnetic body and the second magnetic body to a rear surface of the display may be adjusted by the first support and the second support. The first support and the second support, respectively, may cause the first magnetic body and the second magnetic body to be spaced apart from the rear surface of the display in the open state. The first support and the second support, respectively, may cause the first magnetic body and the second magnetic body to contact the rear surface of the display in the closed state. The first magnetic body and the second magnetic body may be disposed at opposite positions with the display interposed therebetween in the closed state, and the lengths of the first support and the second support, respectively, may increase in a direction of the display in a state in which the first magnetic body and the second magnetic body mutually apply an attractive force. The first support and the second support may comprise a compressible material.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
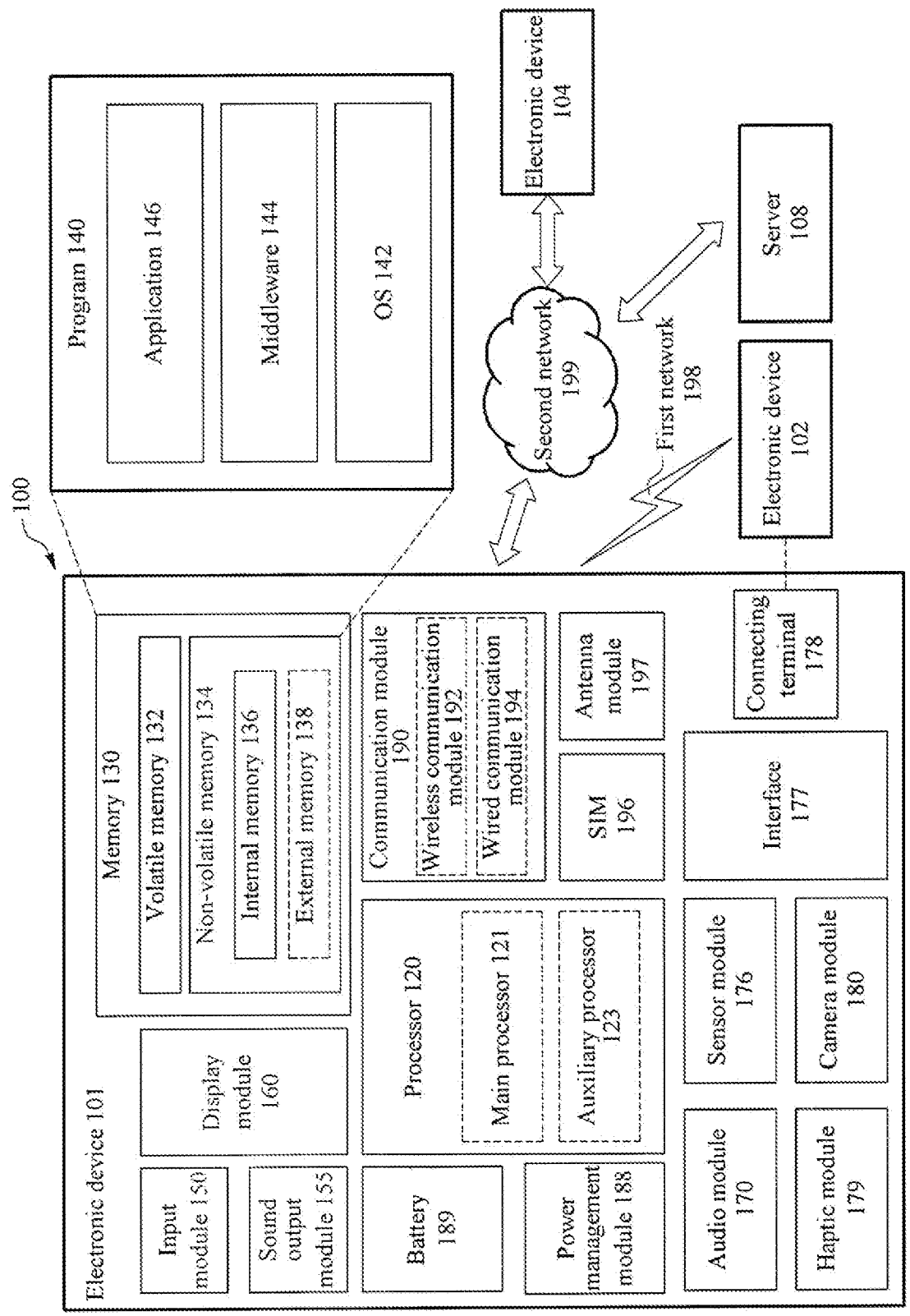
FIG. 1 is a block diagram of an electronic device in a network environment according to various embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram of an electronic device in a network environment according to various embodiments.

Referring to FIG. 1, an electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to certain embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of disclosures and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
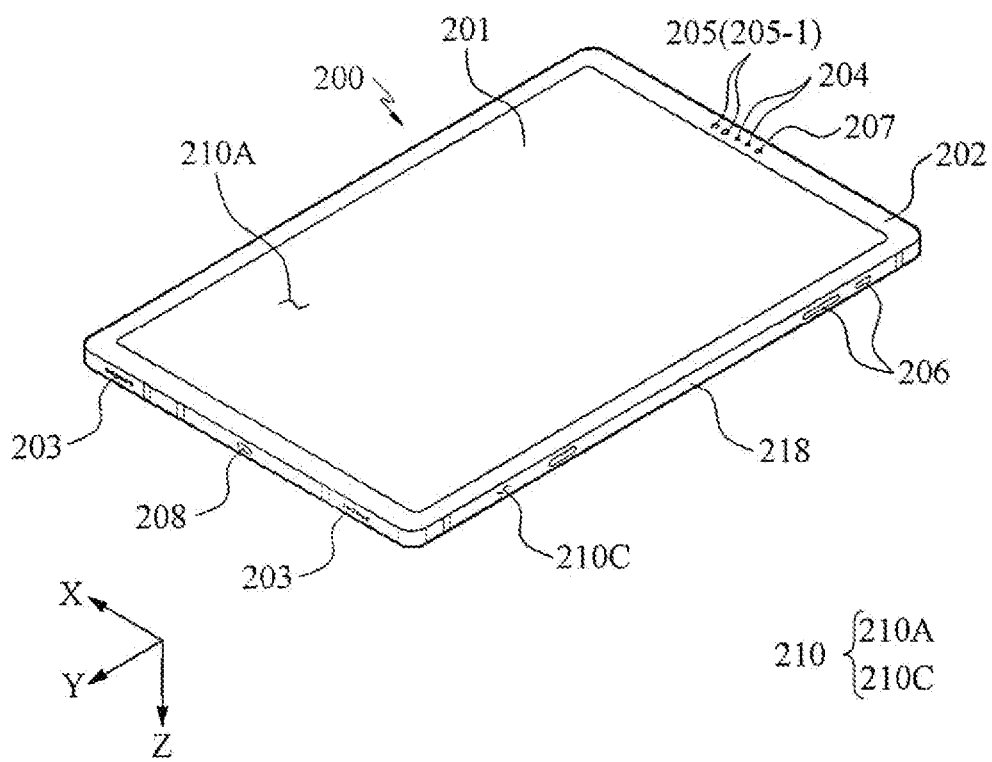
FIG. 2A is a front perspective view of an electronic device according to an embodiment.
Figure 2B:
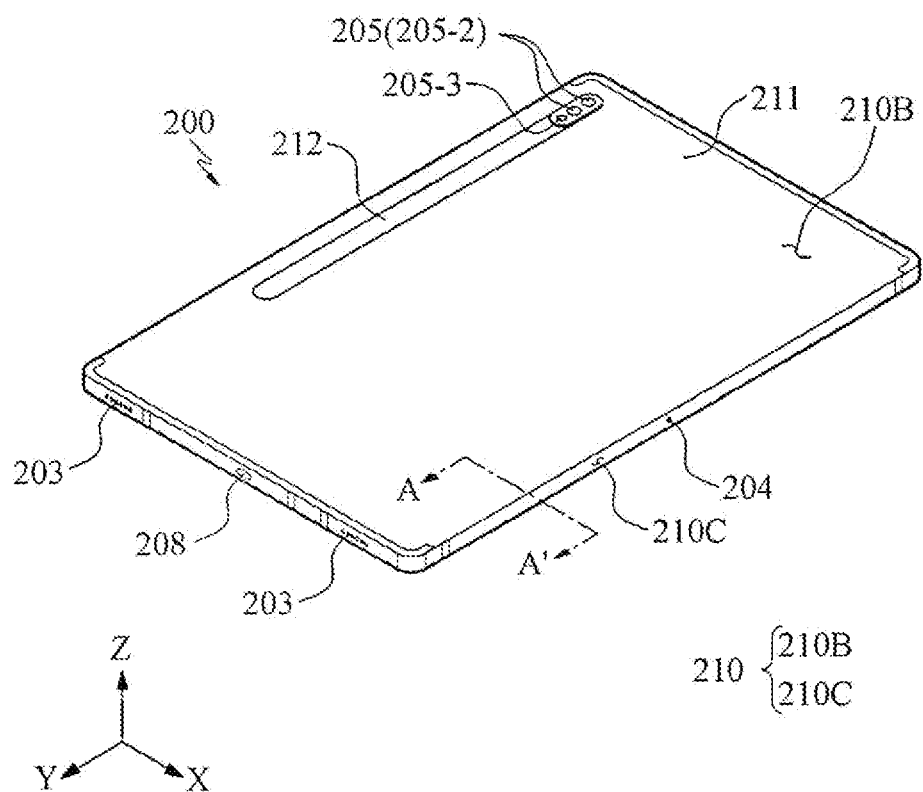
FIG. 2B is a rear perspective view of an electronic device according to an embodiment.

FIG. 2A is a front perspective view of an electronic device according to an embodiment, and FIG. 2B is a rear perspective view of the electronic device according to an embodiment.

Referring to FIGS. 2A and 2B, an electronic device 200 (e.g., the electronic device 101 of FIG. 1) according to an embodiment may include a housing 210 having a first surface (or front surface) 210A, a second surface (or rear surface) 210B, and a side surface 210C surrounding a space between the first surface 210A and the second surface 210B. In another embodiment (not shown), a housing may refer to a structure that forms a portion of the first surface 210A, the second surface 210B, and the side surface 210C of FIG. 2A. In an embodiment, the first surface 210A may be formed of a first plate 202 (e.g., a glass plate or a polymer plate including various coating layers) of which at least a portion is substantially transparent. The second surface 210B may be formed of a second plate 211 that is substantially opaque. The second plate 211 may be formed of, for example, coated or tinted glass, ceramic, polymer, metal (e.g., aluminum, stainless steel (STS), or magnesium), or a combination of at least two thereof. The side surface 210C may be coupled to the first plate 202 and the second plate 211 and may be formed by a side member 218 including metal and/or polymer. In an embodiment, the second plate 211 and the side member 218 may be integrally formed and may include the same material (e.g., a metal material such as aluminum).

According to an embodiment, the electronic device 200 may include at least one of a display 201, an audio module 203, a sensor module 204, a camera module 205, a key input device 206, a light emitting device 207, and a connector hole 208. In an embodiment, the electronic device 200 may omit at least one of the components (e.g., the light emitting device 207) or additionally include other components.

The display 201 may be exposed through a substantial portion of the first plate 202, for example. In some embodiments, an edge of the display 201 may be formed to be substantially the same as an adjacent outer shape of the first plate 202. In another embodiment (not shown), in order to expand the exposed area of the display 201, a distance between the edge of the display 201 and the edge of the first plate 202 may be substantially the same.

In another embodiment (not shown), the electronic device 200 may have a recess or an opening formed in a portion of a screen display area of the display 201, and may include at least one of the audio module 203, the sensor module 204, the camera module 205, and the light emitting device 207 that are aligned with the recess or the opening. In another embodiment (not shown), the display 201 may be coupled to or arranged adjacent to a touch sensing circuit, a pressure sensor for measuring an intensity (pressure) of a touch, and/or a digitizer for detecting a magnetic field-based pen input device.

The audio modules 203 may include a microphone hole and a speaker hole. The microphone hole may have therein a microphone for acquiring an external sound, and in some embodiments, may have a plurality of microphones for detecting the direction of a sound. The speaker hole may include an external speaker hole and/or a receiver hole for a call. In some embodiments, the speaker hole and the microphone hole may be implemented as a single hole, or a speaker (e.g., a piezo speaker) may be included without the speaker hole.

The sensor module 204 may generate an electrical signal or a data value corresponding to an internal operational state of the electronic device 200 or an external environmental state. The sensor module 204 may be disposed, for example, on the first surface 210A or the second surface 210B of the housing 210, and may be additionally or alternatively disposed on the side surface 210C. The sensor module may further include at least one of a proximity sensor, an illuminance sensor, a biometric sensor, a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

The camera module 205 may include a first camera device 205-1 disposed on the first surface 210A of the electronic device 200, and a second camera device 205-2 disposed on the second surface 210B of the electronic device 200, and/or a flash 205-3. The camera devices 205-1 and 205-2 may include one or more lenses, an image sensor, and/or an ISP. The flash 205-3 may include, for example, a light-emitting diode (LED) or a xenon lamp. In some embodiments, two or more lenses (e.g., infrared camera, wide-angle, and telephoto lenses) and image sensors may be disposed on one surface of the electronic device 200.

The key input device 206 may be disposed on the side surface 210C of the housing 210. In another embodiment, the electronic device 200 may not include a portion or entirety of the key input device 206 mentioned above, and the key input device 206 that is not included may be implemented in another form such as a soft key on the display 201.

The light emitting device 207 may be disposed, for example, on the first surface 210A of the housing 210. The light emitting device 207 may provide, for example, state information of the electronic device 200 in the form of light. In another embodiment, the light emitting device 207 may provide, for example, a light source that is linked to the operation of the camera module 205. The light emitting device 207 may include, for example, an LED, an IR LED, and a xenon lamp.

The connector hole 208 may include a connector hole for accommodating a connector (e.g., a universal serial bus (USB) connector) for transmitting and receiving power and/or data to and from an external electronic device, and/or a connector hole for accommodating a connector (e.g., an earphone jack) for transmitting and receiving audio signals to and from an external electronic device.

Figure 3:
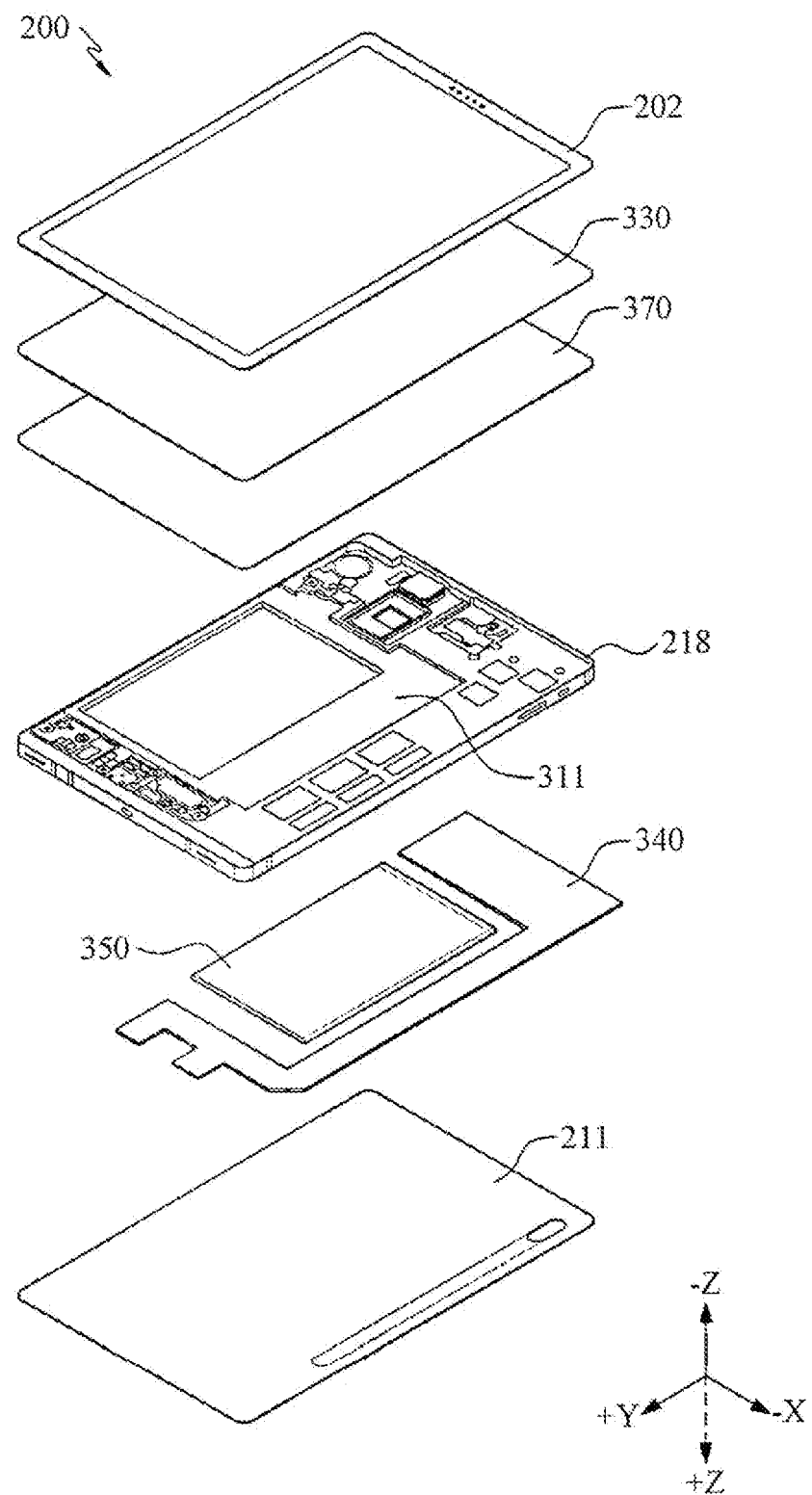
FIG. 3 is an exploded perspective view of an electronic device according to an embodiment.

FIG. 3 is an exploded perspective view of an electronic device according to an embodiment.

Referring to FIG. 3, the electronic device 200 may include a side member 218, a first support member 311 (e.g., a bracket), the first plate 202, a display 330 (e.g., the display 201 of FIG. 2A), an electromagnetic induction panel 370, a PCB 340, a battery 350, and the second plate 211. In some embodiments, the electronic device 200 may omit at least one of the components (e.g., the first support member 311) or additionally include other components. A duplicate description of those described with reference to FIGS. 1, 2A, and 2B, among the components of the electronic device 200 to be described with reference to FIG. 3, will be omitted.

In certain embodiments, the electromagnetic induction panel 370 (e.g., a digitizer) may be a panel for detecting an input of a pen input device. For example, the electromagnetic induction panel 370 may include a PCB (e.g., a flexible printed circuit board (FPCB)) and a shielding sheet. The shielding sheet may prevent mutual interference resulting from an electromagnetic field generated by the components (e.g., the display, the PCB, the electromagnetic induction panel, etc.) included in the electronic device 200. The shielding sheet may block the electromagnetic field generated by the components, thereby enabling an input from the pen input device to be accurately transmitted to a coil included in the electromagnetic induction panel 370.

According to certain embodiments, the first support member 311 may be disposed inside the electronic device 200 and connected to the side member 218 or may be formed integrally with the side member 218. The first support member 311 may be formed of, for example, a metal material and/or a non-metal material (e.g., polymer). The display 330 may be connected to one surface of the first support member 311, and the PCB 340 may be connected to the other surface of the first support member 311. The PCB 340 may be provided with a processor, a memory, and/or an interface mounted thereon. The processor may include, for example, one or more of a central processing unit (CPU), an application processor (AP), a graphics processing unit (GPU), an image signal processor, a sensor hub processor, or a communication processor.

In certain embodiments, the memory may include, for example, a volatile memory or a non-volatile memory. The interface may include, for example, a high-definition multimedia interface (HDMI), a universal serial bus (USB) interface, a secure digital (SD) card interface, or an audio interface. The interface may include, for example, a USB connector, an SD card/multimedia connect (MMC) connector, or an audio connector, to connect, electrically or physically, the electronic device 200 to an external electronic device.

According to certain embodiments, the electronic device 200 may further include at least one antenna (not shown). According to an embodiment, the antenna may be disposed between the second plate 211 and the battery 350. The antenna may include, for example, a near-field communication (NFC) antenna, a wireless charging antenna, and/or a magnetic secure transmission (MST) antenna. The antenna may, for example, perform short-range communication with an external device, or wirelessly transmit and receive power required for charging to and from the external device.

Figure 4A:
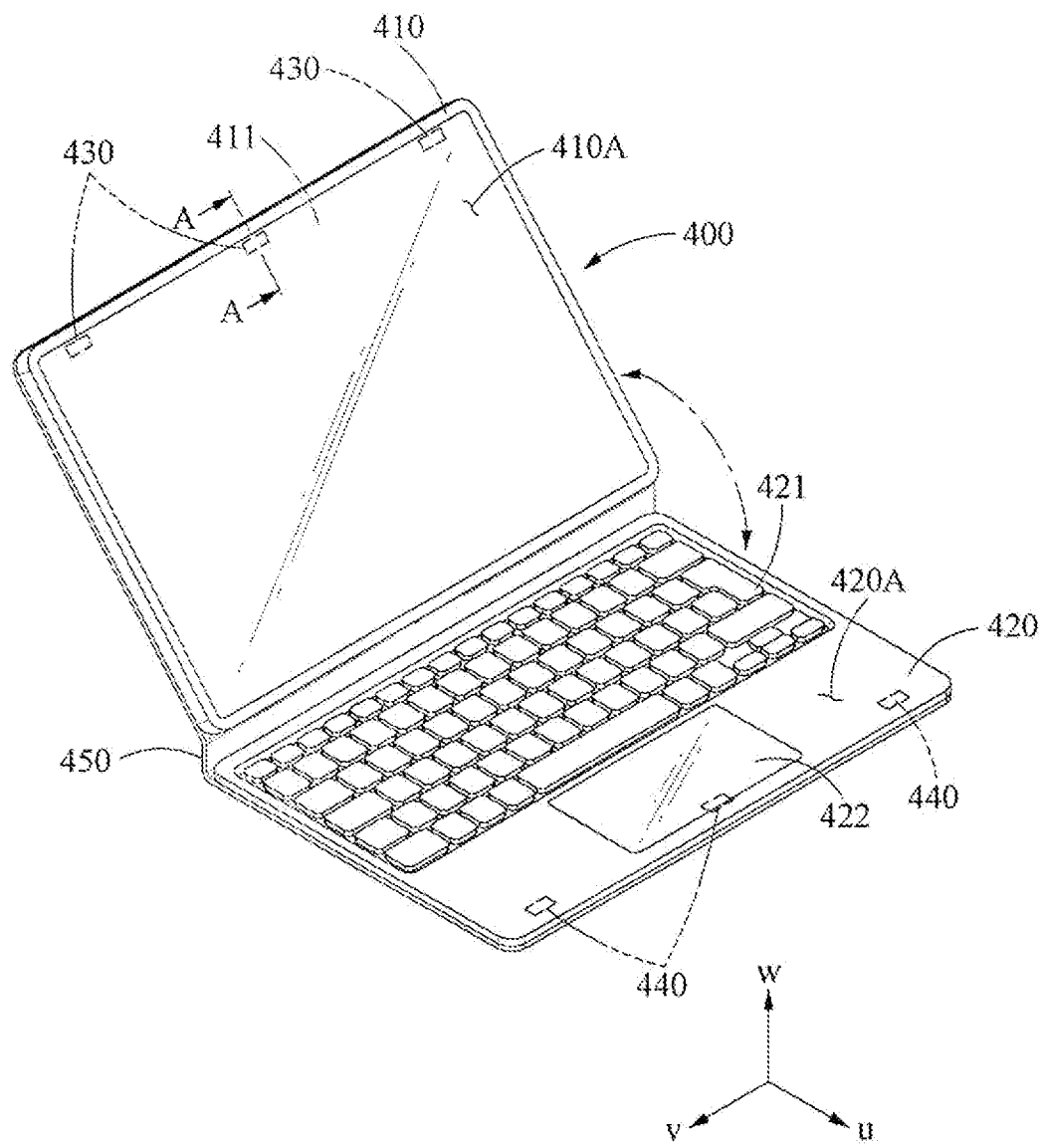
FIG. 4A is a view illustrating an open state of an electronic device according to an embodiment.
Figure 4B:
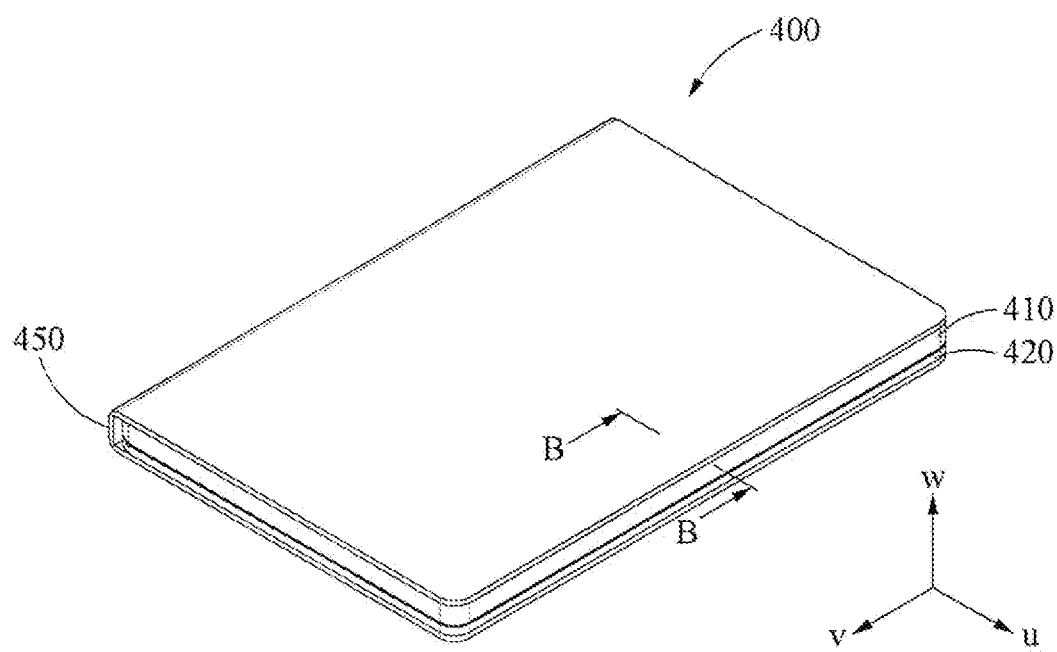
FIG. 4B is a view illustrating a closed state of an electronic device according to an embodiment.
Figure 4C:
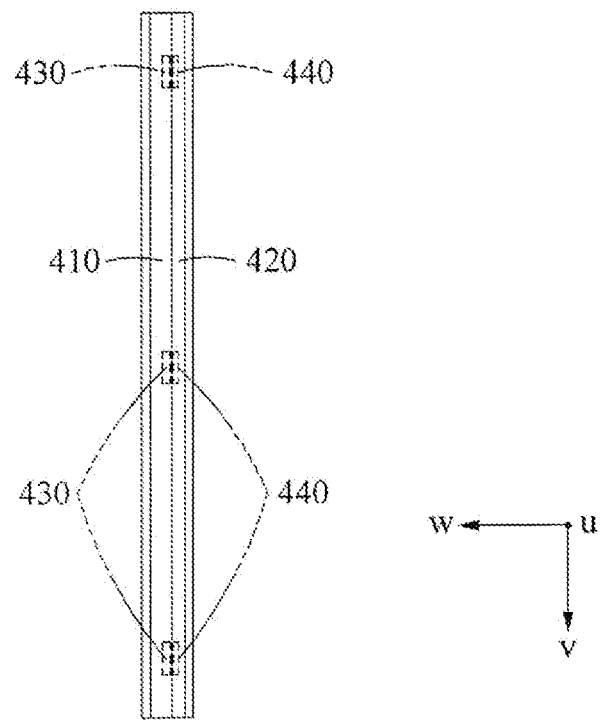
FIG. 4C is a view illustrating an arrangement of magnets in the closed state of FIG. 4B.
Figure 5A:
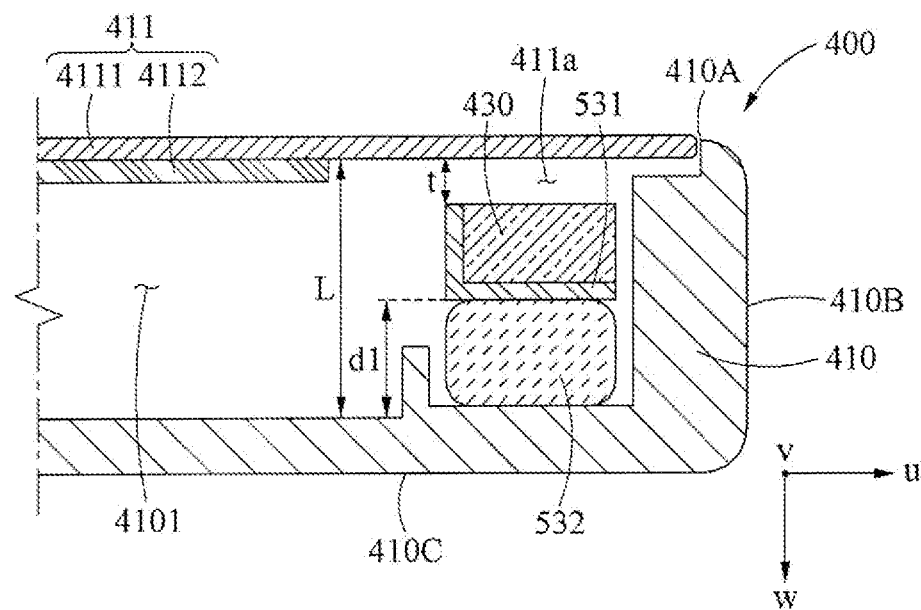
FIG. 5A is a cross-sectional view of the electronic device taken along a line A-A of FIG. 4A.
Figure 5B:
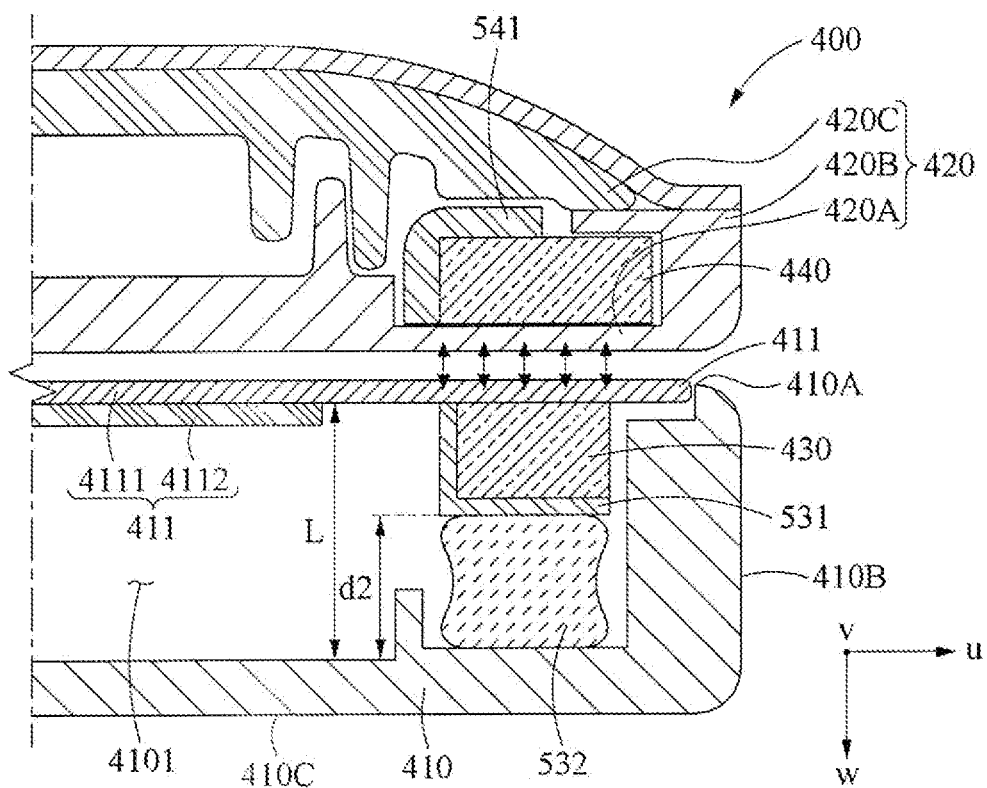
FIG. 5B is a cross-sectional view of the electronic device taken along a line B-B of FIG. 4B.

FIG. 4A is a view illustrating an open state of an electronic device according to an embodiment, FIG. 4B is a view illustrating a closed state of the electronic device according to an embodiment, FIG. 4C is a view illustrating an arrangement of magnets in the closed state of FIG. 4B, FIG. 5A is a cross-sectional view of the electronic device taken along a line A-A of FIG. 4A, and FIG. 5B is a cross-sectional view of the electronic device taken along a line B-B of FIG. 4B.

Referring to FIGS. 4A to 5B, an electronic device 400 (e.g., the electronic device 101 of FIG. 1, the electronic device 200 of FIGS. 2A to 3) may be deformed in shape according to a use state. For example, the electronic device 400 may be provided in a foldable type that may be selectively folded or unfolded by a user.

In an embodiment, the electronic device 400 may include a first housing 410, a second housing 420, a display 411, a first magnetic body 430, a second magnetic body 440, and a support 532.

The first housing 410 may form an exterior of the electronic device 400. In an embodiment, the first housing 410 may include a first surface (or front surface) 410A, a second surface (or rear surface) 410C, and a third surface (or side surface) 410B surrounding a first space formed between the first surface 410A and the second surface (or rear surface) 410C. In this case, the first surface 410A may be formed with most areas thereof open such that the display 411 may be exposed to the outside therethrough.

The second housing 420 may be connected to the first housing 410. In an embodiment, the second housing 420 may include a first cover surface 420A, a second cover surface 420C, and a third cover surface 420B surrounding a second space formed between the first cover surface 420A and the second cover surface 420C. In an embodiment, the second housing 420 may have a shape corresponding to the first housing 410, for example, such that the first cover surface 420A may have a size and an area corresponding to the first surface 410A.

In an embodiment, the second housing 420 may include a keyboard 421 and a touch member 422 disposed on the first cover surface 420A. The keyboard 421 and the touch member 422 may be exposed to the outside through the first cover surface 420A and manipulated by the user. Manipulation information of the user input through the keyboard 421 and the touch member 422 may be input to a processor (e.g., the processor 120 of FIG. 1).

In an embodiment, the electronic device 400 may change a connection state between the first housing 410 and the second housing 420 according to the use state. For example, the electronic device 400 may change a relative connection state between the first housing 410 and the second housing 420 so as to be in an open state (e.g., the open state of FIG. 4A) in which a front surface of the first housing 410 is visually exposed to the outside and a closed state (e.g., the closed state of FIG. 4B) in which the front surface of the first housing 410 is visually occluded by the second housing 420. In an embodiment, the second housing 420 may be spaced apart from the first surface 410A to be in the open state or visually occlude the first surface 410A through the first cover surface 420A to be in the closed state. In the closed state, the first cover surface 420A may be disposed to substantially face the first surface 410A.

In an embodiment, the first housing 410 and the second housing 420 may be integrally connected to each other so as to be mutually rotatable through a hinge structure connecting the first housing 410 and the second housing 420, or may be provided as independent components to be connected through a separate member connecting the first housing 410 and the second housing 420. For example, as shown in FIG. 4A, the electronic device 400 may include a cover member 450 surrounding the first housing 410 and the second housing 420 at the same time, and the first housing 410 and the second housing 420 may be connected such that the relative position may change between the open state and the closed state through the cover member 450.

In certain embodiments, the display 411 may display visual information (e.g., a text, a video, and/or an image) to the user. In an embodiment, the display 411 may be connected to the first housing 410 and visually exposed to the outside of the electronic device 400 through the first surface 410A of the first housing 410. For example, the display 411 may be seated on a recess formed on the first surface 410A of the first housing 410 and constitute most of the first surface 410A.

In an embodiment, the display 411 may include a display panel 4112 and a protective glass 4111 (or a protective film or a window) laminated on the outer surface of the display panel 4112. In an embodiment, the protective film 4111, which is a thin film layer formed of a transparent material, may protect the display panel 4112 from an external environment and support a flexibility of the display panel 4112. In an embodiment, the protective film 4111 may include a plastic film (e.g., a polyimide film) or thin glass (e.g., ultra-thin glass (UTG)).

In an embodiment, the display panel 4112 may include an unbreakable (UB) type organic light-emitting diode (OLED) display (e.g., a curved display) including a micro-LED, or an OLED. In an embodiment, a touch panel (not shown) may be formed in at least a portion of the display panel 4112, and the display panel 4112 may include an on-cell touch active-matrix organic light-emitting diode (AMOLED) (OCTA) type display. Meanwhile, the type of the display panel 4112 is not limited to the above-described embodiment, and the display panel 4112 may be formed in various types (e.g., an add-on type or an in-cell type).

In an embodiment, the display panel 4112 may include a plurality of layers. For example, the display panel 4112 may include an electromagnetic wave shielding layer, a substrate layer, a thin film transistor (TFT) layer, an electrode layer, a protective layer, an organic material layer, or a pixel layer. The display panel 4112 may emit light for transmitting information to the user from a pixel, and the emitted light may pass through a transparent protective layer and be transmitted to the outside.

In an embodiment, the display 411 may include a bezel area 411a in which the display panel 4112 is omitted. For example, the bezel area 411a may be formed at an edge portion of the display 411 adjacent to a side surface of a housing (e.g., the rear surface 410C of the first housing 410). In an embodiment, the display panel 4112 may have a smaller area than the protective film 4111, thereby being omitted from a rear surface of the protective film 4111 positioned in the bezel area 411a. However, this is merely an example, and the position and the structure of the bezel area 411a of the display 411 are not limited thereto.

In an embodiment, when the display 411 is exposed through the first surface 410A, the display 411 may have a different operational state according to the relative connection state of the second housing 420 to the first housing 410. For example, the display 411 may be visually exposed to the outside in the open state, thereby displaying visual information to the user. On the other hand, the display 411 may be occluded through the first cover surface 420A not to be visually exposed to the outside in the closed state. In an embodiment, the ON/OFF of a screen of the display 411 may be controlled according to the open state or the closed state. For example, the display 411 may be controlled to turn off the screen in the closed state to prevent unnecessary power consumption.

In various embodiments, the first magnetic body 430 and the second magnetic body 440 may be disposed in the first housing 410 and the second housing 420, respectively, and may mutually apply a magnetic force in the closed state.

In an embodiment, the first magnetic body 430 may be disposed in a first space 4101 inside the first housing 410. For example, the first magnetic body 430 may be disposed between the side surface 410C and the display 411. In a state in which a front surface of the first housing 410 is viewed, the first magnetic body 430 may be disposed to overlap the display 411. In an embodiment, the first magnetic body 430 may be disposed on a rear surface of the bezel area 411a of the display 411. For example, the first magnetic body 430 may be disposed in an area adjacent to the third surface 410B of the first housing 410, for example, in an area adjacent to the edge of the display 411. In an embodiment, the first magnetic body 430 may be disposed to face a rear surface of the display 411. In other words, in a state in which a separate structure is omitted between the first magnetic body 430 and the display 411, an end portion of the first magnetic body 430 may directly face the rear surface of the display 411. In an embodiment, a relative distance of the first magnetic body 430 to the display 411 may be adjusted according to the magnetic force acting thereon, for example, the magnetic force applied thereto by the corresponding second magnetic body 440.

In an embodiment, the second magnetic body 440 may be disposed between the first cover surface 420A and the third cover surface 420C of the second housing 420. In an embodiment, the second magnetic body 440 may be disposed in an area adjacent to the second cover surface 420B of the second housing 420, for example, in an area adjacent to the edge of the first cover surface 420A. In an embodiment, the second magnetic body 440 may be disposed at a position corresponding to the first magnetic body 430, that is, at a position to mutually apply a magnetic force effectively. For example, based on the closed state, the first magnetic body 430 and the second magnetic body 440 may be disposed to face each other with the display 411 interposed therebetween. In other words, when the display 411 is viewed in the closed state, the first magnetic body 430 and the second magnetic body 440 may overlap each other.

In an embodiment, a plurality of first magnetic bodies 430 may be disposed in the first housing 410, and a plurality of second magnets 440 corresponding to the plurality of first magnetic bodies 430, respectively, may be disposed in the second housing 420. In an embodiment, the plurality of first magnetic bodies 430 may be disposed at positions overlapping the display 411 in a state in which the first surface 410A is viewed, and the plurality of second magnetic bodies 440 may be disposed at positions corresponding to the positions of the plurality of first magnetic bodies 430, respectively. Based on the closed state, of the plurality of first magnetic bodies 430 and second magnetic bodies 440, a first magnetic body 430 and a second magnetic body 440 corresponding to each other may be disposed to overlap about the display 411. Hereinafter, for ease of description, a first magnetic body 430 and a second magnetic body 440 corresponding to each other will be mainly described.

In an embodiment, the first magnetic body 430 and the second magnetic body 440 may be disposed to mutually apply an attractive force. For example, a pole formed by a portion of the first magnetic body 430 facing the rear surface of the display 411 and a pole formed by a portion of the second magnetic body 440 facing the first cover surface 420A may be opposite to each other.

In an embodiment, the distance between the first magnetic body 430 and the second magnetic body 440 may change according to the connection state of the first housing 410 and the second housing 420. For example, the first magnetic body 430 and the second magnetic body 440 may have the shortest distance in the closed state. In an embodiment, since the first magnetic body 430 and the second magnetic body 440 corresponding to each other are disposed to mutually apply an attractive force, the highest attractive force may act between the first magnetic body 430 and the second magnetic body 440 in the closed state. Accordingly, in the closed state, the first magnetic body 430 and the second magnetic body 440 may firmly maintain a state in which the first surface 410A and the first cover surface 420A face each other through the mutual attractive force, that is, a state in which the display 411 is occluded.

In an embodiment, shielding members 531 and 541 for shielding a magnetic force may be connected to outer surfaces of the first magnetic body 430 and the second magnetic body 440. For example, a first shielding member 531 may be attached to at least a portion of the outer surface of the first magnetic body 430, and a second shielding member 541 may be attached to at least a portion of the outer surface of the second magnetic body 440. The shielding members 531 and 541 may be used to block the magnetic force emitted by the first magnetic body 430 and the second magnetic body 440 from being emitted toward the centers of the housings 410 and 420, and at the same time to maintain the positions of the first magnetic body 430 and the second magnetic body 440 inside the first housing 410 and the second housing 420 by being connected to other members inside the electronic device 400. In an embodiment, the first shielding member 531 and the second shielding member 541 may be omitted from portions on which a magnetic force acts between the first magnetic body 430 and the second magnetic body 440, for example, from an end portion of the first magnetic body 430 facing the first surface 410A and an end portion of the second magnetic body 440 facing the first cover surface 420A. In an embodiment, when the first magnetic body 430 is disposed on the rear surface of the bezel area 411a of the display 411, the first shielding member 531 may be omitted from an outer surface portion of the first magnetic body 430 facing the side surface (e.g., the third surface 410B) of the first housing 410. In this case, the second shielding member 541 may be omitted from the outer surface portion of the second magnetic body 440 facing the third cover surface 420B. According to this structure, the first shielding member 531 and the second shielding member 541 may prevent the magnetic force of the first magnetic body 430 and the second magnetic body 440 from being emitted to the display panel 4112 or a component positioned inside (e.g., in the central portions of) the first housing 410 and the second housing 420, while allowing the magnetic force between the first magnetic body 430 and the second magnetic body 440 to pass therethrough.

In an embodiment, the support 532 may support the first magnetic body 430 in the first space 4101 inside the first housing 410. The support 532 may connect the second surface 410C of the first housing 410 and the first magnetic body 430, thereby causing the first magnetic body 430 to be spaced apart from the second surface 410C. In an embodiment, a length of the support 532 in a connection direction from the second surface 410C to the first surface 410A may change, whereby a relative position of the first magnetic body 430 in the first housing 410 may be adjusted. For example, the support 532 may be compressed or elongated in the connection direction (e.g., the w-axial direction of FIG. 5B), thereby moving the first magnetic body 430 connected thereto. In an embodiment, the length of the support 532 in the connection direction may be adjusted according to the magnetic force applied to the first magnetic body 430, for example, the magnetic force applied by the second magnetic body 440. For example, when an attractive force acts between the first magnetic body 430 and the second magnetic body 440 in the closed state, the support 532 may extend in the connection direction, thereby moving the first magnetic body 430 toward the display 411. Conversely, when a repulsive force acts between the first magnetic body 430 and the second magnetic body 440, the support 532 may be compressed in the connection direction, thereby moving the first magnetic body 430 away from the display 411.

In an embodiment, the support 532 may adjust the distance between the first magnetic body 430 and the display 411 according to the state of the electronic device 400. For example, the support 532 may cause the first magnetic body 430 to be spaced apart from the display 411 in a state in which the display 411 is used, and cause the first magnetic body 430 to contact the display 411 in a state in which the display 411 is not used. In an embodiment, the support 532 may cause the first magnetic body 430 to be spaced apart from the rear surface of the display 411 in the open state of the electronic device 400. On the other hand, the length of the support 532 in the connection direction may increase so that the first magnetic body 430 may contact the rear surface of the display 411 in the closed state of the electronic device 400. In other words, in the process in which the electronic device 400 changes to the open state and the closed state, the length of the support 532 in the connection direction may decrease or increase, thereby causing the first magnetic body 430 to contact or be spaced apart from the display 411.

Referring to FIGS. 5A and 5B, the distance between the first magnetic body 430 and the rear surface of the display 411 may be adjusted according to the use state of the electronic device 400. For example, in the open state of the electronic device 400 as shown in FIG. 5A, the first magnetic body 430 may be pulled toward the second surface 410C by the support 532, thereby being spaced apart from the rear surface of the display 411 by a predetermined interval t. In this case, the support 532 may have a first length d1 in the connection direction. On the other hand, in the closed state of the electronic device 400 as shown in FIG. 5B, the distance between the first magnetic body 430 and the second magnetic body 440 may decrease, such that the magnitude of the magnetic force acting on the first magnetic body 430 may increase. When an attractive force acts between the first magnetic body 430 and the second magnetic body 440, the first magnetic body 430 may be pulled by the second magnetic body 440 in the direction of the display 411 (e.g., the −w axis of FIG. 5B), and a connector may increase in length to have a second length d2 in the connection direction, thereby moving the second magnetic body 440 toward the display 411. In an embodiment, the length of the connector may increase in the connection direction such that the first magnetic body 430 may contact the rear surface of the display 411 based on the closed state. In this case, the support 532 may apply a restoring force in a direction opposite to the magnetic field applied to the first magnetic body 430, that is, toward the second surface 410C, such that the first magnetic body 430 may not press the rear surface of the display 411 by a preset pressure or higher. In other words, in the closed state, the magnetic force of the second magnetic body 440 applied to the first magnetic body 430 and the restoring force of the connector may be in equilibrium.

According to this structure, the first magnetic body 430 may be spaced apart from the display 411 in the open state and contact the display 411 only in the closed state, and thus, damage to the display 411 due to pressing by the first magnetic body 430 may be minimized. In addition, since the first magnetic body 430 may be disposed as close as possible to the second magnetic body 440 when contacting the rear surface of the display 411 in the closed state, the magnetic force between the first magnetic body 430 and the second magnetic body 440 may maximally act, such that the attaching force of the first housing 410 and the second housing 420 may be strongly maintained.

Figure 6A:
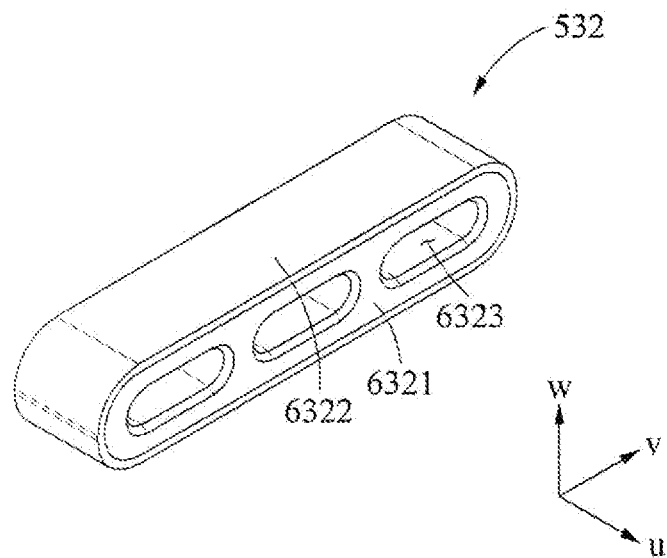
FIG. 6A is a perspective view of a support according to an embodiment.
Figure 6B:
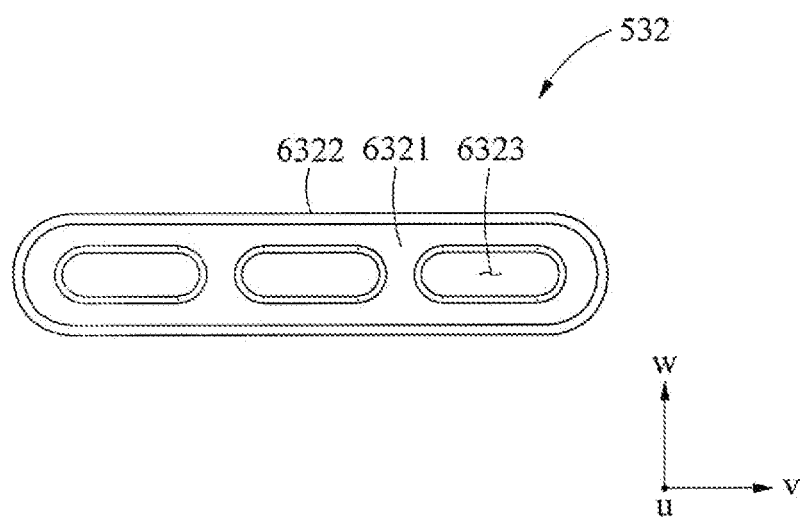
FIG. 6B is a plan view of a support according to an embodiment.

FIG. 6A is a perspective view of a support according to an embodiment, and FIG. 6B is a plan view of the support according to an embodiment.

Referring to FIGS. 6A and 6B, the support 532 according to an embodiment may be formed of a compressible elastic material. For example, the support 532 may include a material that may be elongated and compressed through a restoring force, such as rubber, a compression sponge, silicone, or soft plastic.

In an embodiment, the support 532 may be formed to be compressed or elongated in a connection direction (e.g., the w-axial direction of FIG. 6A) according to an external force applied thereto. In an embodiment, the support 532 may include a compression part 6321 formed of an elastic material, one or more hollows 6323 formed through the compression part 6321 in a direction perpendicular to the connection direction, and a cover film 6322 applied to an outer surface of the compression part 6321. In an embodiment, when an external force is applied to the support 532, the compression part 6321 may be compressed or elongated in the connection direction through the hollows 6323 such that the length in the connection direction may change.

Figure 7:
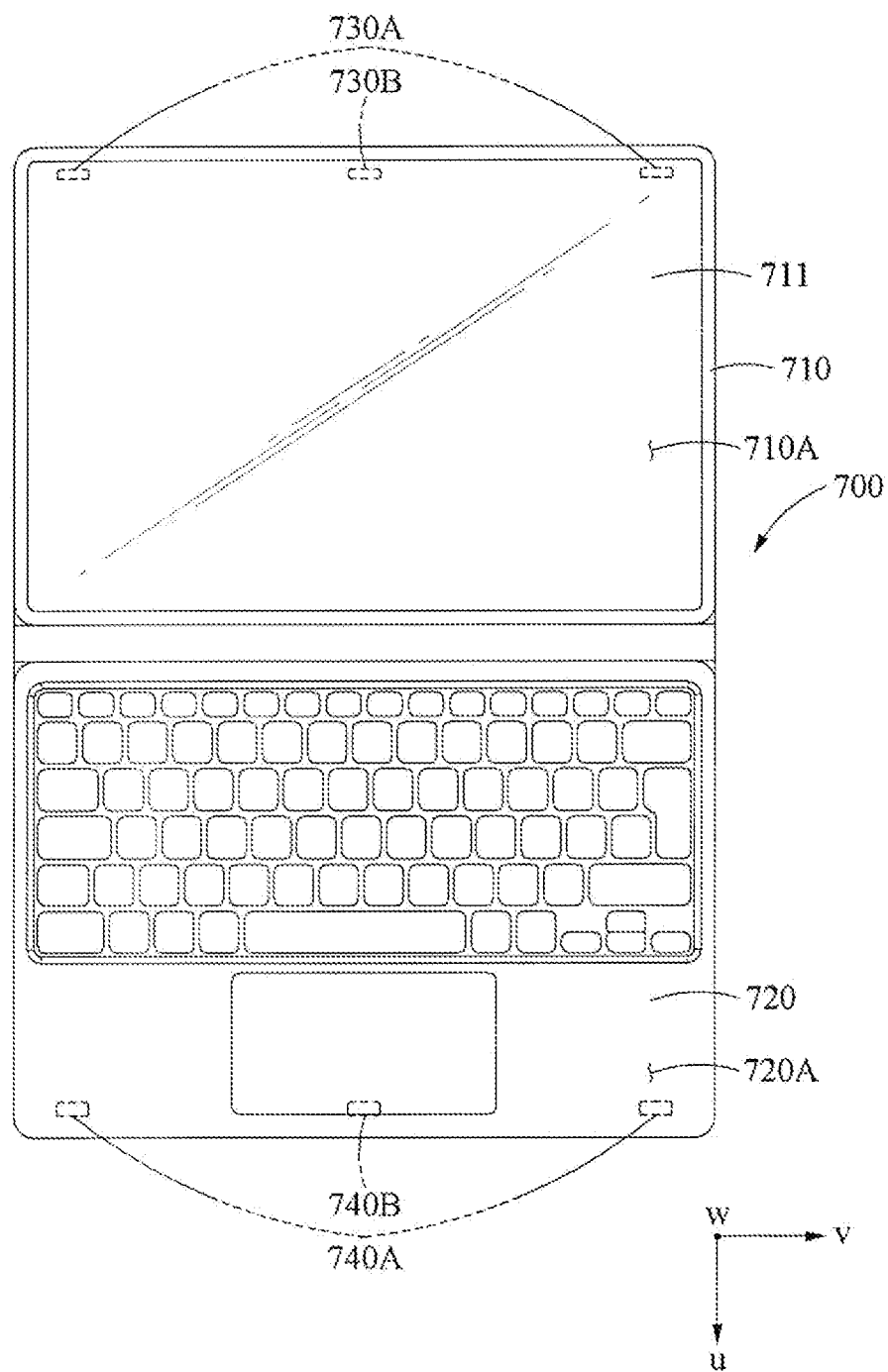
FIG. 7 is a view illustrating an arrangement of a first magnetic body and a second magnetic body in an electronic device according to an embodiment.

FIG. 7 is a view illustrating an arrangement of a first magnetic body and a second magnetic body in an electronic device according to an embodiment.

Referring to FIG. 7, an electronic device 700 according to an embodiment may include a first housing 710, a second housing 720, first magnetic bodies 730A and 730B, and second magnetic bodies 740A and 740B.

In an embodiment, the plurality of first magnetic bodies 730A and 730B may be disposed in the first housing 710. The plurality of first magnetic bodies 730A and 730B may be disposed to overlap a display 711 in a state in which a first surface 710A of the first housing 710 is viewed. The plurality of second magnetic bodies 740A and 740B may be disposed in the second housing 720. The plurality of second magnetic bodies 740A and 740B may be disposed to overlap a first cover surface 720A of the second housing 720. In this case, the plurality of second magnetic bodies 740A and 740B may be disposed at positions corresponding to the plurality of first magnetic bodies 730A and 730B, respectively, in a state in which the first surface 710A and the first cover surface 720A face each other (e.g., in the closed state of FIG. 4B). For example, the first magnetic bodies 730A and 730B and the second magnetic bodies 740A and 740B disposed at positions corresponding to each other may be disposed to face each other with the display 711 interposed therebetween, in a state in which the first surface 710A and the first cover surface 720A face each other.

In an embodiment, the first magnetic bodies 730A and 730B and the second magnetic bodies 740A and 740B disposed at positions corresponding to each other may mutually apply a magnetic force in a state in which the first surface 710A and the first cover surface 720A face each other. In this case, at least one first magnetic body 730B of the first magnetic bodies 730A and 730B and at least one second magnetic body 740B of the second magnetic bodies 740A and 740B corresponding to each other may be disposed to apply a repulsive force to each other. In other words, a some of the first magnetic bodies 730A and a some of the second magnetic bodies 740B disposed at positions corresponding to each other may be disposed to mutually apply an attractive force, and at least one first magnetic body 730B and at least one second magnetic body 740B may be disposed to apply a repulsive force to each other. For example, when three first magnetic bodies 730A and 730B and three second magnetic bodies 740A and 740B are disposed side by side in the first housing and the second housings, respectively, as shown in FIG. 7, the two first magnetic bodies 730A and the two second magnetic bodies 740A disposed on both sides may mutually apply an attractive force, and the first magnetic body 730B and the second magnetic body 740B disposed in the center may be disposed to mutually apply a repulsive force. However, this is an example for ease of description, and the positions and numbers of first magnetic bodies 730A and 730B and second magnetic bodies 740A and 740B disposed in the first housing 710 and the second housing 720 are not limited thereto.

According to this structure, it is possible to buffer an impact force according to the contact between the first surface 710A and the first cover surface 720A through the first magnetic body 730B and the second magnetic body 740B that mutually apply a repulsive force in the process of operating the electronic device 700 to be closed, and it is possible to firmly maintain the arrangement state of the first surface 710A and the first cover surface 720A facing each other through the first magnetic bodies 730A and the second magnetic bodies 740A that mutually apply an attractive force after the electronic device 700 is closed.

Figure 8A:
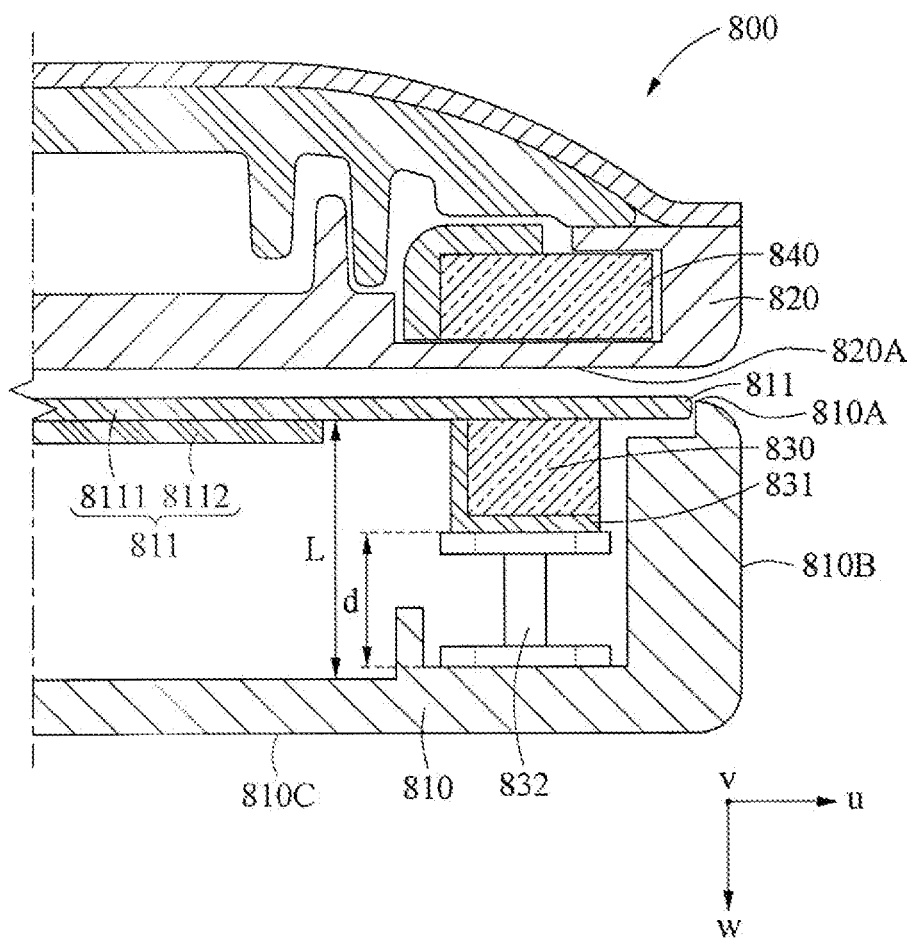
FIG. 8A is a cross-sectional view of an electronic device according to an embodiment.
Figure 8B:
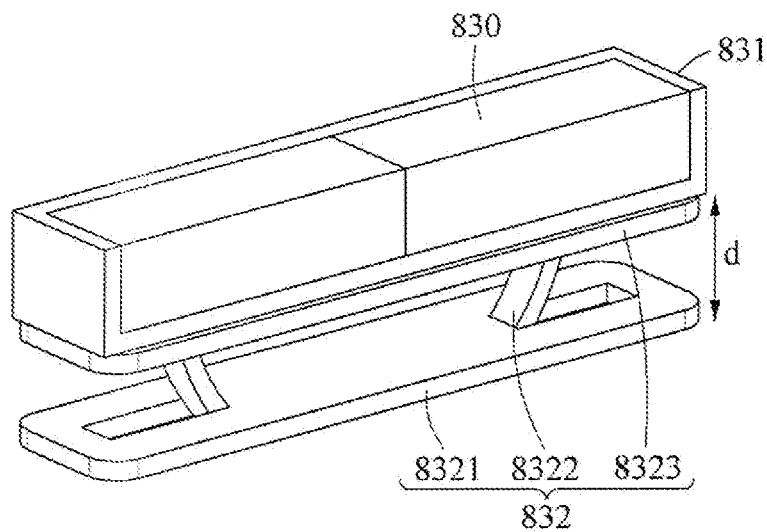
FIG. 8B is a perspective view of a support according to an embodiment.
Figure 8B:
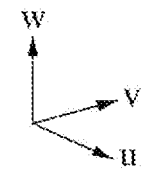

FIG. 8A is a cross-sectional view of an electronic device according to an embodiment, and FIG. 8B is a perspective view of a support according to an embodiment.

Referring to FIGS. 8A and 8B, an electronic device 800 according to an embodiment may include a first housing 810, a second housing 820, a display 811, a first magnetic body 830, a second magnetic body 840, and a support 832.

The first housing 810 may include a first surface 810A, a second surface 810C opposite to the first surface 810A, and a third surface 810B surrounding a space between the first surface 810A and the surface 810C. The display 811 may be connected to the first housing 810 to be exposed through the first surface 810A.

The second housing 820 may be connected to the first housing 810 such that the electronic device 800 may be in a closed state (e.g., the closed state of FIG. 4A) in which the display 811 is not visually exposed (i.e., occluded) to an outside or an open state (e.g., the open state of FIG. 4B) in which the display 811 is visually exposed the outside. In the closed state as shown in FIG. 8A, the second housing 820 may be disposed to face the display 811 through the first cover surface 820A.

The first magnetic body 830 and the second magnetic body 840 may be disposed in the first housing 810 and the second housing 820, respectively, and maintain the closed state of the electronic device 800 by mutually applying an attractive force. In an embodiment, the first magnetic body 830 may be disposed at a position overlapping the display 811 in a state in which the display 811 is viewed. In an embodiment, the first magnetic body 830 may be disposed to face a rear surface of the display 811, and a distance between the first magnetic body 830 and the rear surface of the display 811 may be adjusted by a magnetic force acting thereon. In an embodiment, the first magnetic body 830 may be disposed in an area adjacent to a third surface 810B of the first housing 810. For example, the first magnetic body 830 may be disposed in a rear area of the display 811 in which a display member 8112 is omitted and a protective film 8111 is positioned. The first magnetic body 830 may be adjusted in position in a connection direction (e.g., the w-axial direction), for example, to be spaced apart from the rear surface of the display 811 in the open state (e.g., the open state of FIG. 4B) and to contact the rear surface of the display 811 in the closed state as shown in FIG. 9A. In an embodiment, a shielding member 831 for blocking the magnetic force of the first magnetic body 830 may be attached to an outer surface of the first magnetic body 830. The shielding member 831 may block the magnetic force of the first magnetic body 830 from being directed toward the display panel 8112.

The second magnetic body 840 may be disposed in the second housing 820 so as to be positioned on the opposite side of the first magnetic body 830 with the display 811 interposed therebetween based on the closed state. In the closed state, the second magnetic body 840 may pull the first magnetic body 830 toward the display 811 by applying an attractive force to the first magnetic body 830.

The support 832 may support the first magnetic body 830 inside the first housing 810. In an embodiment, the support 832 may connect the second surface 810C of the first housing 810 and the first magnetic body 830 and adjust the length in the connection direction (e.g., the w-axial direction) according to an external force acting thereon, thereby adjusting a distance between the display 811 and the first magnetic body 830. For example, when an attractive force acts between the first magnetic body 830 and the second magnetic body 840, a length d of the support 832 may increase in the connection direction such that the first magnetic body 830 may contact the rear surface of the display 811. In an embodiment, the support 832 may generate a restoring force according to the change in the length d in the connection direction, whereby when the external force applied to the first magnetic body 830 is removed, the length of the support 832 may decrease such that the first magnetic body 830 may be spaced apart from the rear surface of the display 811.

In an embodiment, the support 832 may be provided in the form of a structure that generates a restoring force according to a change in length. For example, the support 832 may include a base 8321 disposed on the second surface 810C, a support plate 8323 spaced apart from the base 8321 in the connection direction and connected to a first magnet, and a connector 8322 connecting the base 8321 and the support plate 8323 so that a distance between the base 8321 and the support plate 8323 is adjusted. In an embodiment, the connector 8322 may adjust the distance d between the support plate 8323 and the base 8321 by changing the shape according to a force acting on the support plate 8323, and at the same time generate a restoring force for the support 832 to return to the original length through a repulsive force according to the change in shape. In an embodiment, the support 832 may be formed of polycarbonate (PC), urethane, or a metal material.

According to this structure, the support 832 may increase the length in the connection direction to cause the first magnetic body 830 to contact the rear surface of the display 811 when an attractive force acts between the first magnetic body 830 and the second magnetic body 840 in the closed state of the electronic device 800, and through a restoring force, apply a force to pull the first magnetic body 830 in a direction toward the second surface 810C such that the first magnetic body 830 may not press the display 811 by a set pressure or higher. In this case, the support 832 may decrease the length d in the connection direction through the restoring force when the magnetic force acting on the first magnetic body 830 decreases in the open state of the electronic device 800, thereby causing the first magnetic body 830 to be spaced apart from the rear surface of the display 811.

Figure 9:
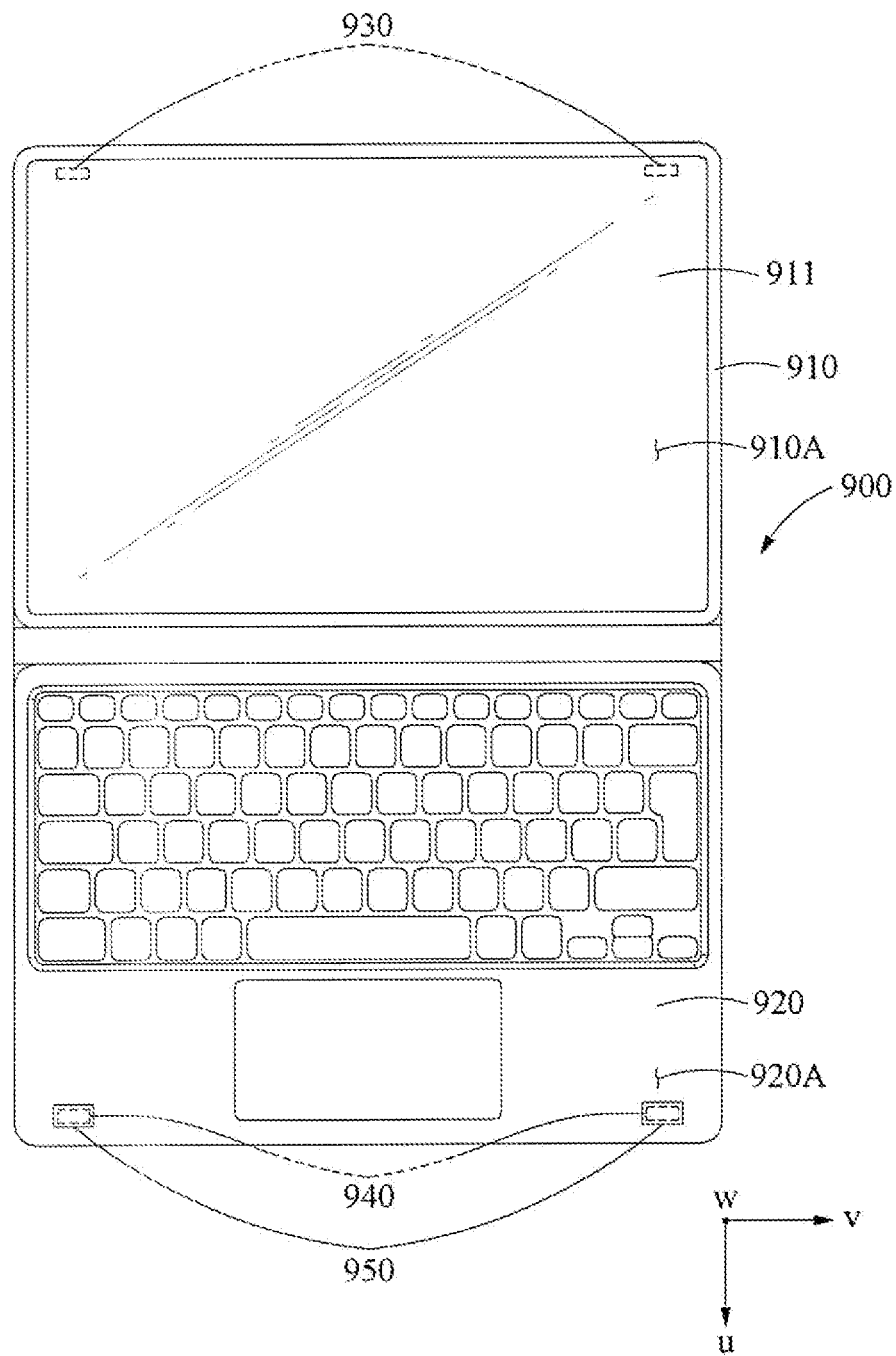
FIG. 9 is a plan view of an electronic device according to an embodiment.
Figure 10A:
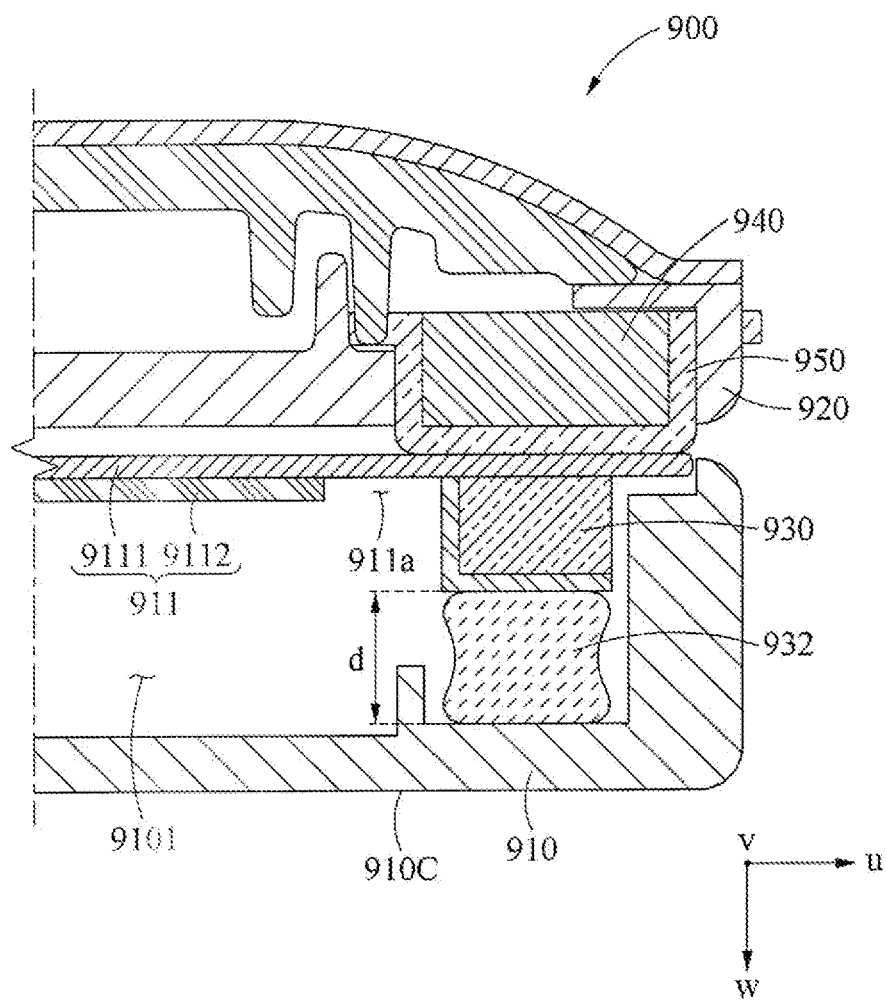
FIG. 10A is a cross-sectional view of an electronic device according to an embodiment.
Figure 10B:
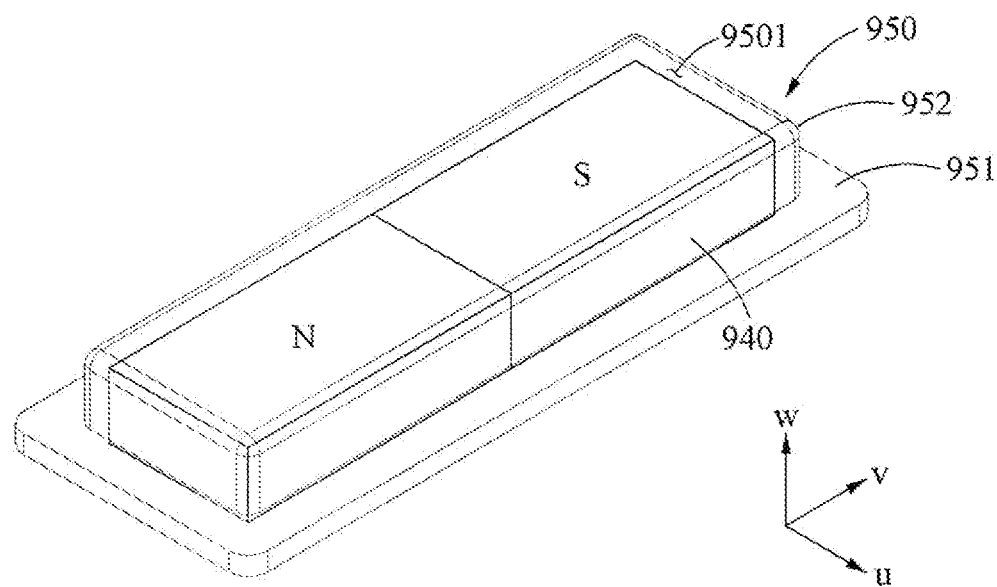
FIG. 10B is a see-through perspective view of a damper according to an embodiment.
Figure 11:
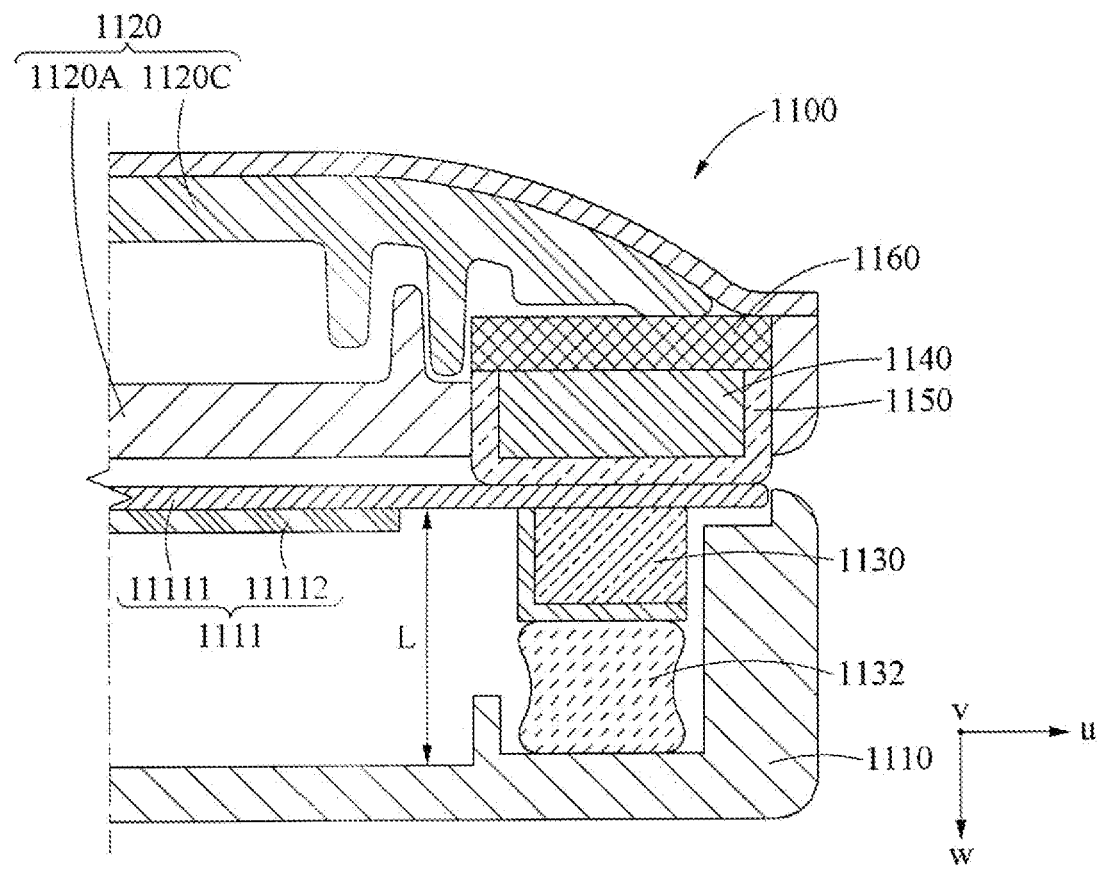
FIG. 11 is a cross-sectional view of an electronic device according to an embodiment.

FIG. 9 is a plan view of an electronic device according to an embodiment, FIG. 10A is a cross-sectional view of the electronic device according to an embodiment, FIG. 10B is a see-through perspective view of a damper according to an example embodiment, and FIG. 11 is a cross-sectional view of the electronic device according to an embodiment.

Referring to FIGS. 9, 10A, and 10B, an electronic device 900 according to an embodiment may include a first housing 910, a second housing 920, a display 911, a first magnetic body 930, a second magnetic body 940, which may include poles N and S, a support 932, and a damper member 950.

The second housing 920 may be connected to the first housing 910 so that an operational state of the electronic device 900 may be changed. For example, the second housing 920 may be connected to the first housing 910 for the electronic device 900 to be in an open state in which a first surface 910A of the first housing 910 is visually exposed to an outside or a closed state in which the first surface 910A of the first housing 910 is not visually exposed to the outside. In an embodiment, a first cover surface 920A of the second housing 920 may be disposed to substantially face the first surface 910A of the first housing 910. The display 911 may be connected to the first housing 910 and exposed to the outside through the first surface 910A. In the open state, the display 911 may be visually exposed to the outside, as shown in FIG. 9. In the closed state, the display 911 may not be visually exposed to the outside as being covered by the second housing 920, as shown in FIG. 10A. In an embodiment, the display 911 may include a protective film 9111 and a display panel 9112. The display 911 may include a bezel area 911a in which the display panel 9112 is omitted.

In the closed state of the electronic device 900, that is, the state in which the first surface 910A and the first cover surface 920A face each other, the first magnetic body 930 and the second magnetic body 940 may maintain the closed state of the electronic device 900 by mutually applying an attractive force. In an embodiment, the first magnetic body 930 may be disposed in an inner space 9101 of the first housing 910, which includes a second surface 910C, so as to be positioned between a second surface and the display 911. In this case, the first magnetic body 930 may be disposed on a rear surface of the bezel area 911a of the display 911. In an embodiment, the second magnetic body 940 may be disposed in the second housing 920 so as to be positioned at a position corresponding to the first magnetic body 930, for example, a position to face the first magnetic body 930 with the display 911 interposed therebetween in the closed state.

In an embodiment, the support 932 may connect the second surface of the first housing 910 and the first magnetic body 930 and change the length in a connection direction (e.g., the w-axial direction of FIG. 10A) according to a force acting on the first magnetic body 930, thereby adjusting a distance between the display 911 and the first magnetic body 930.

In an embodiment, the damper member 950 may be connected to the second housing 920 so as to protrude outward from the first cover surface 920A. For example, a through-hole may be formed in the first cover surface 920A, and at least a portion of the damper member 950 may be inserted into the through-hole, such that an end portion thereof may protrude outward from the first cover surface 920A. In an embodiment, the damper member 950 may include an insertion portion 952 to be inserted into the first cover surface 920A through the through-hole, and a flange 951 extending in a lateral direction so as to hang on an inner surface of the first cover surface 920A in a state in which the insertion portion 952 may be inserted into the first cover surface 920A. The damper member 950 may include an accommodating space 9501 formed inside the insertion portion 952.

In an embodiment, the damper member 950 may contact the display 911 with a protruding end portion thereof in the closed state of the electronic device 900, thereby preventing the first cover surface 920A from directly contacting the display 911 in the closed state of the electronic device 900. In an embodiment, the damper member 950 may be formed of a compressible elastic material, for example, rubber, silicone, elastomer, or a plastic material such as a thermoplastic polyurethane (TPU) elastic body. According to this structure, the damper member 950 may absorb an impact during the process of contacting the display 911, thereby preventing a damage to the display 911 due to an operation of closing the electronic device 900.

In an embodiment, the damper member 950 may be connected to a position corresponding to the first magnetic body 930, for example, a position on the first cover surface 920A to face the first magnetic body 930 with the display 911 interposed therebetween in the closed state. In this case, the second magnetic body 940 may be disposed in the accommodating space 9501 of the damper member 950. According to this structure, the damper member 950 may penetrate through the first cover surface 920A and protrude outward, and thus, the second magnetic body 940 may be positioned more approximate to the first magnetic body 930 in the closed state, compared to when positioned in the second housing 920. Accordingly, minimizing the distance between the first magnetic body 930 and the second magnetic body 940 in the closed state may maximize the magnetic force acting between the first magnetic body 930 and the second magnetic body 940.

Referring to FIG. 11, an electronic device 1100 according to an embodiment may include a first housing 1110, a second housing 1120, a display 1111, a first magnetic body 1130, a second magnetic body 1140, a support 1132, a damper member 1150, and a pressing member 1160.

In an embodiment, the display 1111 may include a protective film 11111 and a display panel 11112.

The pressing member 1160 may be disposed inside the second housing 1120 to be connected to the damper member 1150, and may press the damper member 1150 in a direction of a first cover surface 1120A through an elastic force. The pressing member 1160 may be formed of, for example, an elastic material such as a spring or rubber. The pressing member 1160 may apply a pressing force to the damper member 1150 to prevent the damper member 1150 from being pushed in a direction of a second cover surface 1120C due to an impact caused by the contact with the display 1111 in a process of closing the electronic device 1100.

Figure 12A:
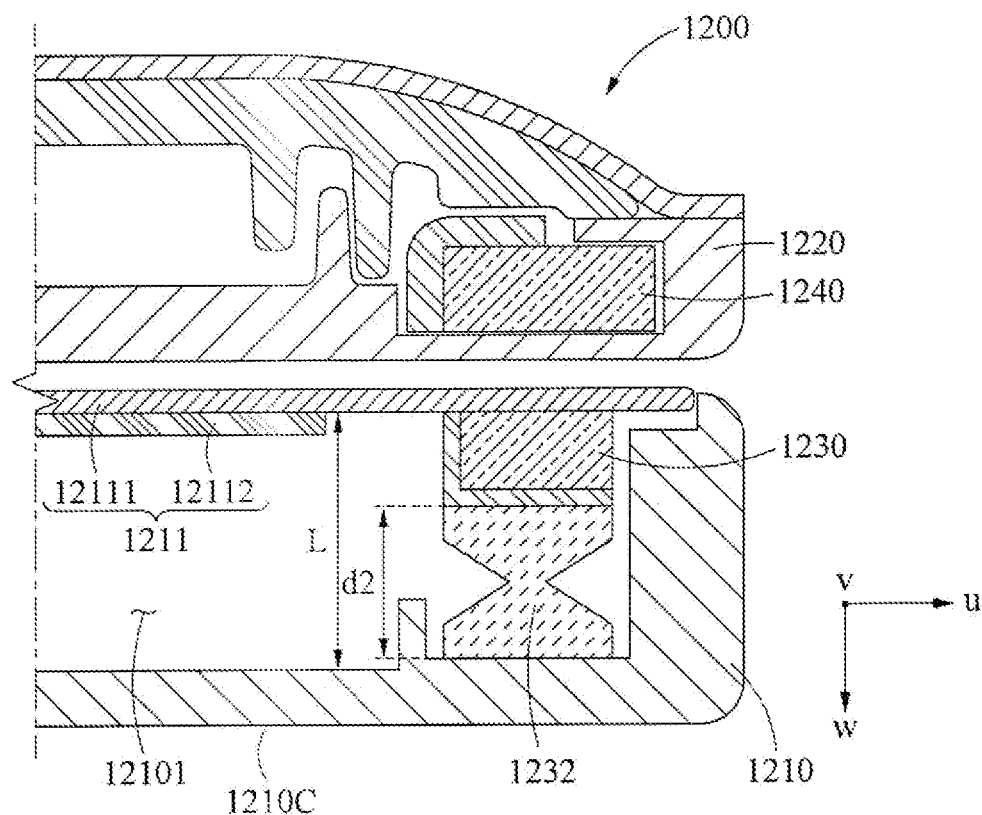
FIGS. 12A and 12B are views illustrating an operation of a first magnetic body in an electronic device according to an embodiment.
Figure 12B:
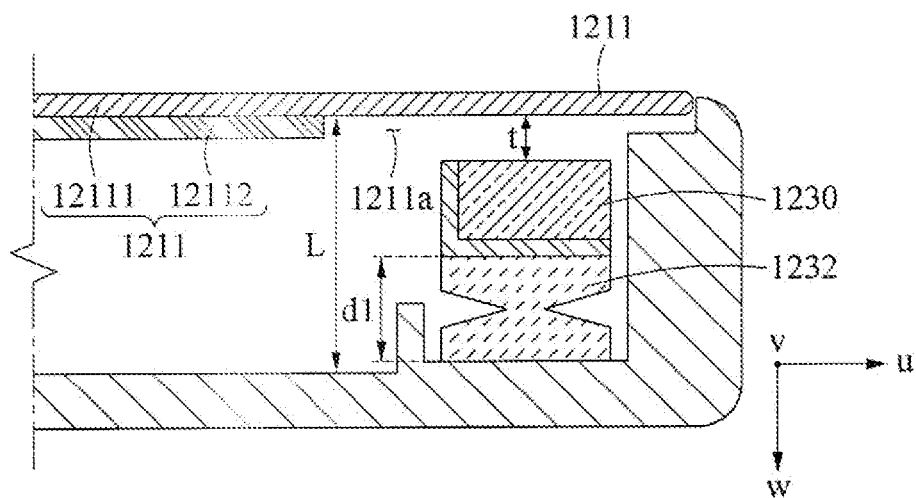

FIGS. 12A and 12B are views illustrating an operation of a first magnetic body in an electronic device according to an embodiment.

Referring to FIGS. 12A and 12B, an electronic device 1200 according to an embodiment may include a first housing 1210, which may include a second surface 1210C, a second housing 1220, a display 1211, a first magnetic body 1230, a second magnetic body 1240, and a support 1232.

In an embodiment, the display 1211 may include a protective film 12111 and a display panel 12112.

In an embodiment, the support 1232 may be disposed inside the first housing 1210 and connect a second surface and the first magnetic body 1230. In an embodiment, the support 1232 may include a shape memory alloy whose shape changes according to temperature. The support 1232 may change the length in a connection direction (e.g., the w-axial direction) according to temperature, thereby adjusting a distance t between the display 1211 and the first magnetic body 1230. In an embodiment, based on the length in the connection direction, the support 1232 may have a first length d1 at a first temperature and have a second length d2 longer than the first length d1 at a second temperature lower than the first temperature. In an embodiment, the display 1211 may include a bezel area 1211a in which the display panel 12112 is omitted.

In an embodiment, the support 1232 may adjust the length in the connection direction according to a change in temperature according to a use state of the electronic device 1200. For example, the electronic device 1200 may have a different internal temperature depending on whether the display 1211 is in operation in a closed state of FIG. 12A and an open state of FIG. 12B. For example, the display 1211 may operate in the open state and may not operate in the closed state, and thus, the electronic device 1200 may have a lower temperature in the closed state than the open state. In an embodiment, the support 1232 may have the first length d1 in the open state of the electronic device 1200, thereby causing the first magnetic body 1230 to be spaced apart from a rear surface of the display 1211, and have the second length d2 longer than the first length d1 in the closed state of the electronic device 1200, thereby causing the first magnetic body 1230 to contact the rear surface of the display 1211.

According to this structure, the support 1232 may cause the first magnetic body 1230 to contact the display 1211 or be spaced apart from the display 1211 according to the internal temperature according to the use state of the electronic device 1200, thereby minimizing the distance between the first magnetic body 1230 and the second magnetic body 1240 in the closed state and preventing the first magnetic body 1230 from pressing the display 1211 in the open state.

Figure 13:
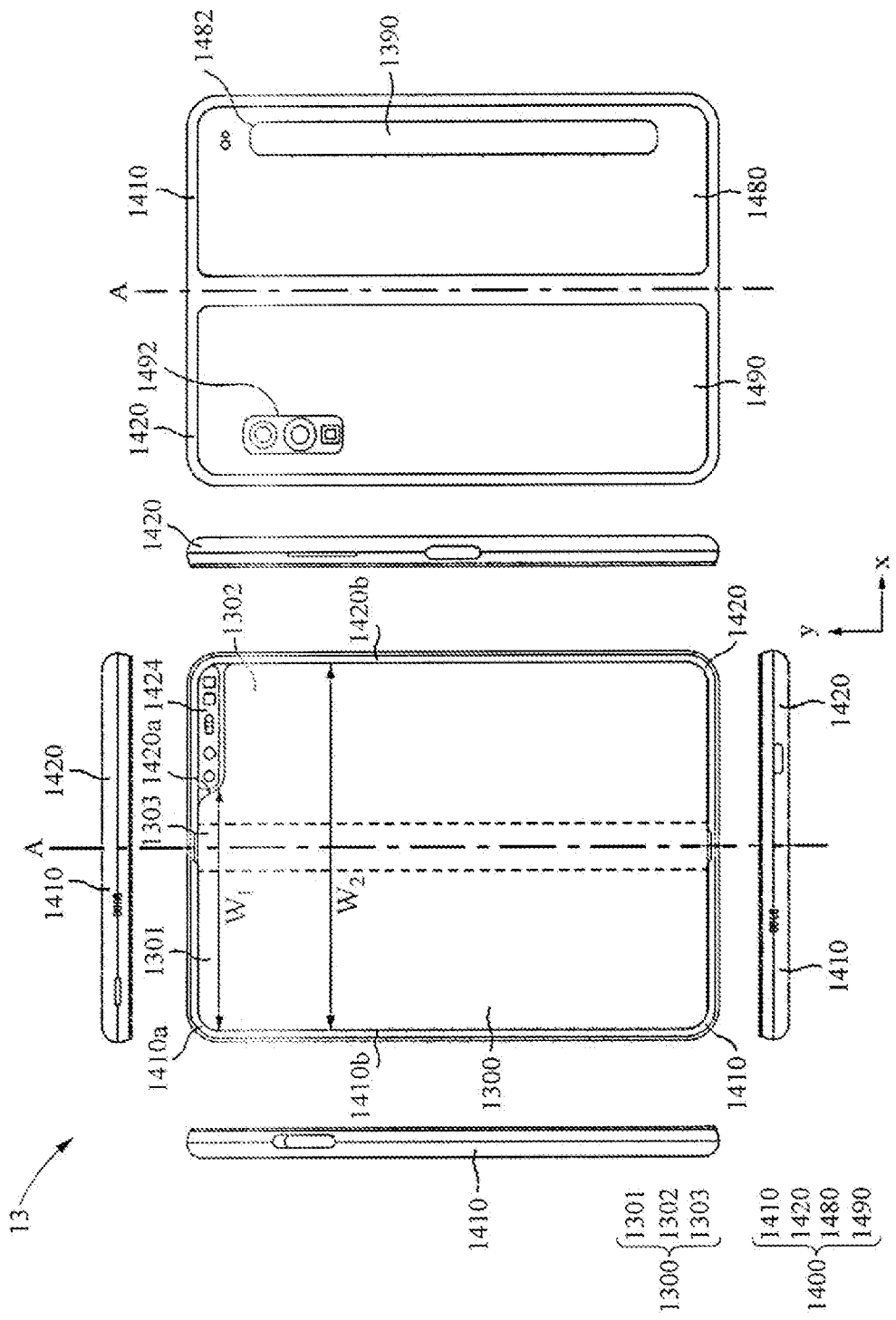
FIG. 13 is a view illustrating an unfolded state of an electronic device according to an embodiment.
Figure 14:
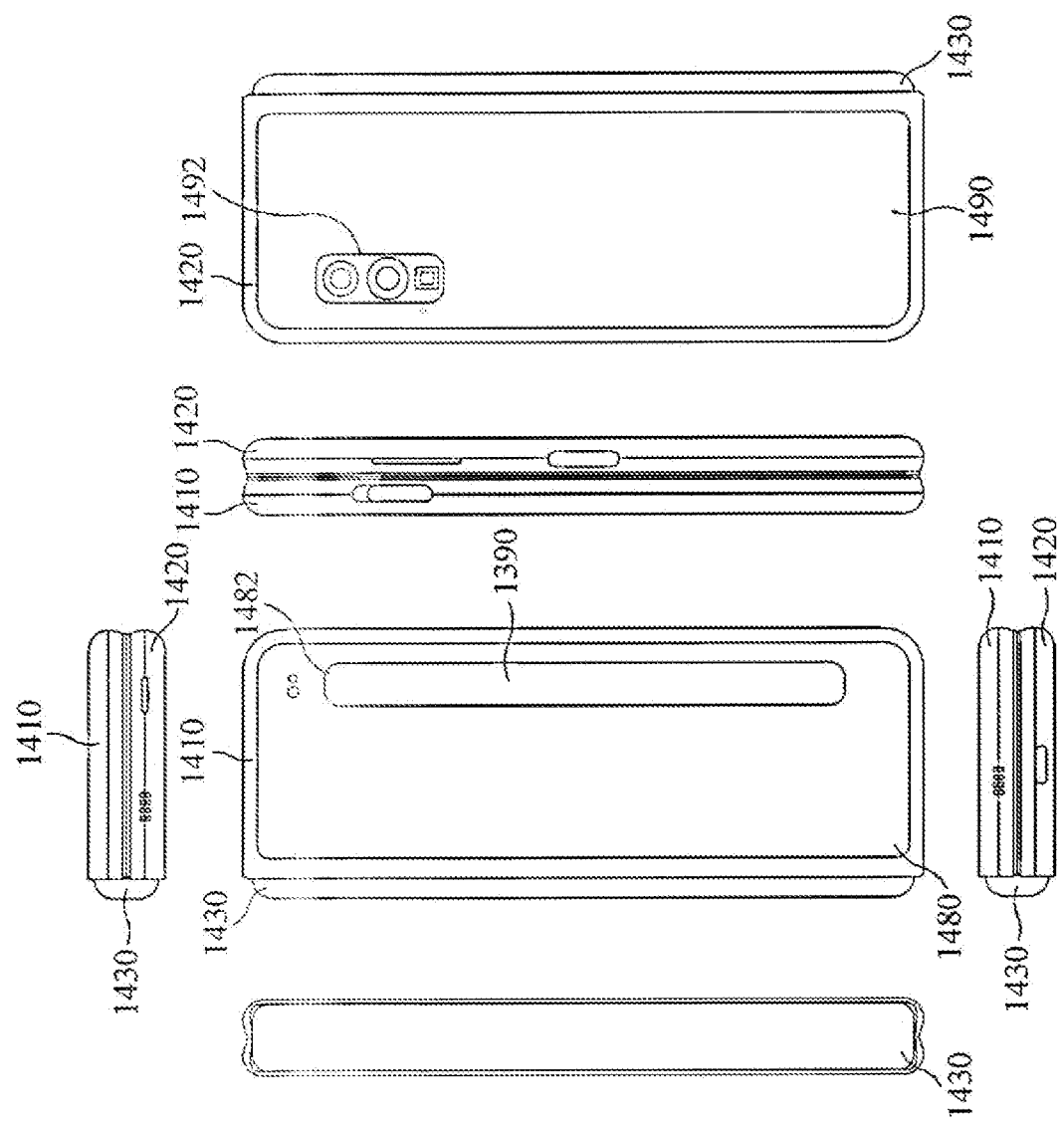
FIG. 14 is a view of a folded state of an electronic device according to an embodiment.

FIG. 13 is a view illustrating an unfolded state of an electronic device according to an embodiment, and FIG. 14 is a view of a folded state of the electronic device according to an embodiment.

Referring to FIGS. 13 and 14, in an embodiment, an electronic device 13 (e.g., the electronic device 101 of FIG. 1) may include a foldable housing 1400, a hinge cover 1430 covering a foldable portion of the fordable housing 1400, and a flexible or foldable display 1300 (hereinafter, the "display" 1300 in short) disposed in a space formed by the foldable housing 1400. Herein, a surface on which the display 1300 is disposed is defined as a first surface or a front surface of the electronic device 13. In addition, a surface opposite to the front surface is defined as a second surface or a rear surface of the electronic device 13. Further, a surface surrounding a space between the front surface and the rear surface is defined as a third surface or a side surface of the electronic device 13.

In an embodiment, the foldable housing 1400 may include a first housing structure 1410, a second housing structure 1420 including a sensor area 1424, a first rear cover 1480, and a second rear cover 1490. The foldable housing 1400 of the electronic device 13 is not limited to the shape and combination shown in FIGS. 13 and 14, and may be implemented in a different shape or a different combination of components. For example, in another embodiment, the first housing structure 1410 and the first rear cover 1480 may be integrally formed, and the second housing structure 1420 and the second rear cover 1490 may be integrally formed.

In the shown embodiment, the first housing structure 1410 and the second housing structure 1420 may be disposed on both sides with respect to a folding axis A, and may be generally symmetrical with respect to the folding axis A. As described below, an angle or distance between the first housing structure 1410 and the second housing structure 1420 may vary depending on whether the electronic device 13 is in an unfolded state, a folded state, or an intermediate state. In the shown embodiment, unlike the first housing structure 1410, the second housing structure 1420 may additionally include the sensor area 1424 in which various sensors are arranged. However, the first housing structure 1410 and the second housing structure 1420 may be mutually symmetrical in areas other than the sensor area 1424.

In an embodiment, as shown in FIG. 13, the first housing structure 1410 and the second housing structure 1420 may together form a recess for accommodating the display 1300. In the shown embodiment, due to the sensor area 1424, the recess may have at least two different widths in a direction perpendicular to the folding axis A.

For example, the recess may have a first width w1 between a first portion 1410*a* of the first housing structure 1410 parallel to the folding axis A and a first portion 1420*a* of the second housing structure 1420 formed on a periphery of the sensor area 1424, and a second width w2 formed by a second portion 1410*b* of the first housing structure 1410 and a second portion 1420*b* of the second housing 1420 not corresponding to the sensor area 1424 and being parallel to the folding axis A. In this case, the second width w2 may be longer than the first width w1. In other words, the first portion 1410*a* of the first housing structure 1410 and the first portion 1420*a* of the second housing structure 1420 that are mutually asymmetrical may form the first width w1 of the recess, and the second portion 1410*b* of the first housing structure 1410 and the second portion 1420*b* of the second housing structure 1420 that are mutually symmetrical may form the second width w2 of the recess. In an embodiment, the first portion 1420*a* and the second portion 1420*b* of the second housing structure 1420 may be at different distances from the folding axis A. The widths of the recess are not limited to the illustrated embodiment. In various embodiments, the recess may have a plurality of widths due to the shape of the sensor area 1424 or the asymmetrical portions of the first housing structure 1410 and the second housing structure 1420.

In an embodiment, at least a portion of the first housing structure 1410 and the second housing structure 1420 may be formed of a metal material or a non-metal material having a selected magnitude of rigidity to support the display 1300.

In an embodiment, the sensor area 1424 may be formed to have a predetermined area adjacent to one corner of the second housing structure 1420. However, the arrangement, shape, and size of the sensor area 1424 are not limited to the illustrated embodiment. For example, in another embodiment, the sensor area 1424 may be provided at another corner of the second housing structure 1420 or in a predetermined area between the top and bottom corners. In an embodiment, components embedded in the electronic device 13 to perform various functions may be exposed to the front surface of the electronic device 13 through the sensor area 1424 or through one or more openings provided in the sensor area 1424. In various embodiments, the components may include various types of sensors. The sensors may include, for example, at least one of a front camera, a receiver, or a proximity sensor.

The first rear cover 1480 may be disposed on one side of the folding axis on a rear surface of the electronic device, and may have, for example, a substantially rectangular periphery that may be surrounded by the first housing structure 1410. Similarly, the second rear cover 1490 may be disposed on the other side of the folding axis on the rear surface of the electronic device, and may have a periphery that may be surrounded by the second housing structure 1420.

In the shown embodiment, the first rear cover 1480 and the second rear cover 1490 may be substantially symmetrical with respect to the folding axis A. However, the first rear cover 1480 and the second rear cover 1490 are not necessarily mutually symmetrical, and in another embodiment, the electronic device 13 may include a first rear cover 1480 and a second rear cover 1490 in various shapes. In still another embodiment, the first rear cover 1480 and the first housing structure 1410 may be integrally formed, and the second rear cover 1490 and the second housing structure 1420 may be integrally formed.

In an embodiment, the first rear cover 1480, the second rear cover 1490, the first housing structure 1410, and the second housing structure 1420 may form a space in which various components (e.g., a PCB, or a battery) of the electronic device 13 are to be disposed. In an embodiment, one or more components may be disposed or visually exposed on the rear surface of the electronic device 13. For example, at least a portion of a sub-display 1390 may be visually exposed through a first rear area 1482 of the first rear cover 1480. In another embodiment, one or more components or sensors may be visually exposed through a second rear area 1492 of the second rear cover 1490. In various embodiments, the sensors may include a proximity sensor and/or a rear camera.

Referring to FIG. 14, the hinge cover 1430 may be disposed between the first housing structure 1410 and the second housing structure 1420 to cover an internal component (e.g., a hinge structure). In an embodiment, the hinge cover 1430 may be occluded by a portion of the first housing structure 1410 and the second housing structure 1420 or may be exposed to the outside, depending on a state (e.g., an unfolded or flat state or a folded state) of the electronic device 13.

As an example, when the electronic device 13 is in the unfolded state as shown in FIG. 13, the hinge cover 1430 may not be exposed as being occluded by the first housing structure 1410 and the second housing structure 1420. As an example, when the electronic device 13 is in the folded state (e.g., a fully folded state) as shown in FIG. 14, the hinge cover 1430 may be exposed to the outside between the first housing structure 1410 and the second housing structure 1420. As an example, when the first housing structure 1410 and the second housing structure 1420 are in an intermediate state of being folded with a predetermined angle, at least a portion of the hinge cover 1430 may be exposed to the outside between the first housing structure 1410 and the second housing structure 1420. However, the area exposed in this case may be smaller than that in the fully folded state. In an embodiment, the hinge cover 1430 may include a curved surface.

The display 1300 may be disposed in a space formed by the foldable housing 1400. For example, the display 1300 may be seated on the recess formed by the foldable housing 1400 and may constitute most of the front surface of the electronic device 13.

Accordingly, the front surface of the electronic device 13 may include the display 1300, and a partial area of the first housing structure 1410 and a partial area of the second housing structure 1420, which are adjacent to the display 1300. In addition, the rear surface of the electronic device 13 may include the first rear cover 1480, a partial area of the first housing structure 1410 adjacent to the first rear cover 1480, the second rear cover 1490, and a partial area of the second housing structure 1420 adjacent to the second rear cover 1490.

The display 1300 may refer to a display of which at least one area is deformable into a planar surface or a curved surface. In an embodiment, the display 1300 may include a folding area 1303, a first area 1301 disposed on one side of the folding area 1303 (e.g., on the left side of the folding area 1303 shown in FIG. 13), and a second area 1302 disposed on the other side of the folding area 1303 (e.g., on the right side of the folding area 1303 shown in FIG. 13).

The area division of the display 1300 shown in FIG. 13 is merely an example, and the display 1300 may be divided into a plurality of areas (e.g., four or more areas, or two areas) depending on the structure or functions thereof. In an embodiment, as shown in FIG. 13, the display 1300 may be divided into areas based on the folding axis A or the folding area 1303 extending in parallel to a y-axis. In another embodiment, the display 1300 may be divided into areas based on another folding area (e.g., a folding area parallel to an x-axis) or another folding axis (e.g., a folding axis parallel to the x-axis).

The first area 1301 and the second area 1302 may be generally symmetrical with respect to the folding area 1303. However, unlike the first area 1301, the second area 1302 may include a notch cut according to the presence of the sensor area 1424, but may be symmetrical with respect to the first area 1301 in the other areas. In other words, the first area 1301 and the second area 1302 may include mutually symmetrical portions and mutually asymmetrical portions.

Operations of the first housing structure 1410 and the second housing structure 1420 and respective areas of the display 1300 depending on the state (e.g., the unfolded or flat state and the folded state) of the electronic device 13 are described herein.

In an embodiment, when the electronic device 13 is in an unfolded or flat state (e.g., FIG. 13), the first housing structure 1410 and the second housing structure 1420 may be disposed to face the same direction, forming an angle of 180 degrees. The surface of the first area 1301 and the surface of the second area 1302 of the display 1300 may face the same direction (e.g., the front direction of the electronic device), forming 180 degrees. The folding area 1303 may form the same plane in conjunction with the first area 1301 and the second area 1302.

In an embodiment, when the electronic device 13 is in the folded state (e.g., FIG. 14), the first housing structure 1410 and the second housing structure 1420 may be disposed to face each other. The surface of the first area 1301 and the surface of the second area 1302 of the display 1300 may face each other, forming a narrow angle (e.g., between 0 degrees to 10 degrees). At least a portion of the folding area 1303 may include a curved surface having a predetermined curvature.

In an embodiment, when the electronic device 13 is in an intermediate state, the first housing structure 1410 and the second housing structure 1420 may be disposed to form a predetermined angle. The surface of the first area 1301 and the surface of the second area 1302 of the display 1300 may form an angle greater than that in the folded state and smaller than that in the unfolded state. At least a portion of the folding area 1303 may include a curved surface having a predetermined curvature, and the curvature when in the unfolded state may be less than that in the folded state.

Figure 15:
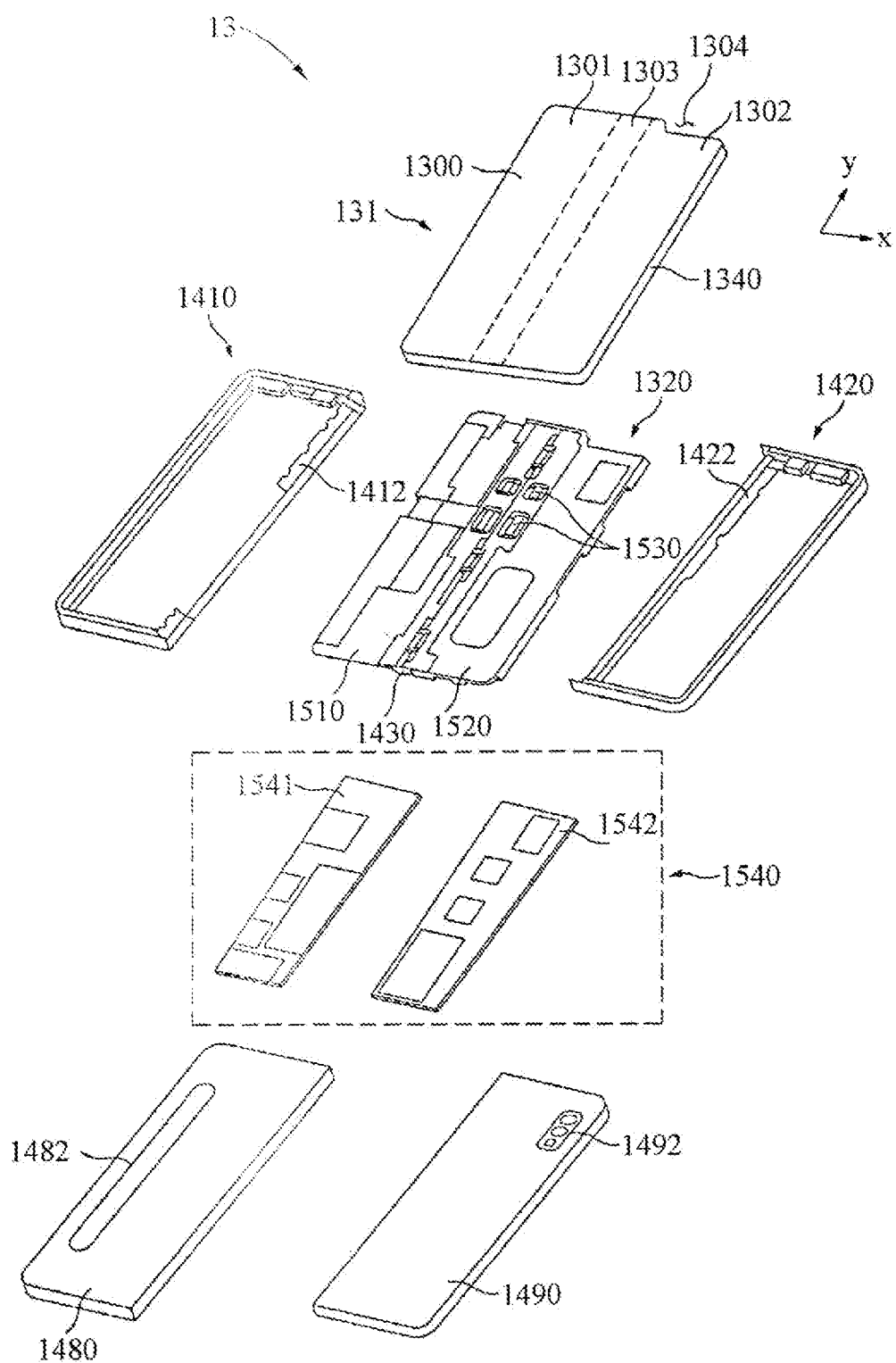
FIG. 15 is an exploded perspective view of an electronic device according to an embodiment.

FIG. 15 is an exploded perspective view of an electronic device according to an embodiment.

Referring to FIG. 15, in an embodiment, the electronic device 13 may include a display unit 131, a bracket assembly 1320, a substrate unit 1540, a first housing structure 1410, a second housing structure 1420, a first rear cover 1480, and a second rear cover 1490. Herein, the display unit 131 may also be referred to as a display module or a display assembly.

The display unit 131 may include the display 1300 and at least one plate or layer 1340 on which the display 1300 is seated. In an embodiment, the plate 1340 may be disposed between the display 1300 and the bracket assembly 1320. The display 1300 may be disposed on at least a portion of one surface (e.g., an upper surface of FIG. 15) of the plate 1340. The plate 1340 may be formed in a shape corresponding to the display 1300. For example, at least one area of the plate 1340 may be formed in a shape corresponding to a notch 1304 of the display 1300.

The bracket assembly 1320 may include a first bracket 1510, a second bracket 1520, a hinge structure disposed between the first bracket 1510 and the second bracket 1520, a hinge cover 1430 for covering the hinge structure when viewed from the outside, and a wiring member 1530 (e.g., a flexible printed circuit board (FPCB)) that traverses the first bracket 1510 and the second bracket 1520.

In an embodiment, the bracket assembly 1320 may be disposed between the plate 1340 and the substrate unit 1540. For example, the first bracket 1510 may be disposed between the first area 1301 of the display 1300 and a first substrate 1541. The second bracket 1520 may be disposed between the second area 1302 of the display 1300 and a second substrate 1542.

In an embodiment, at least a portion of the hinge structure 300 and the wiring member 1530 may be disposed inside the bracket assembly 1320. The wiring member 1530 may be disposed in a direction (e.g., the x-axial direction) that traverses the first bracket 1510 and the second bracket 1520. The wiring member 1530 may be disposed in a direction (e.g., the x-axial direction) perpendicular to a folding axis (e.g., the y-axis or the folding axis A of FIG. 13) of the folding area 1303 of the electronic device 13.

As mentioned above, the substrate unit 1540 may include the first substrate 1541 disposed on the first bracket 1510 and the second substrate 1542 disposed on the second bracket 1520. The first substrate 1541 and the second substrate 1542 may be disposed in a space formed by the bracket assembly 1320, the first housing structure 1410, the second housing structure 1420, the first rear cover 1480, and the second rear cover 1490. Components for implementing various functions of the electronic device 13 may be mounted on the first substrate 1541 and the second substrate 1542.

The first housing structure 1410 and the second housing structure 1420 may be assembled together to be coupled to both sides of the bracket assembly 1320 in a state in which the display unit 131 is coupled to the bracket assembly 1320. As described below, the first housing structure 1410 and the second housing structure 1420 may slide from both sides of the bracket assembly 1320 to be coupled to the bracket assembly 1320.

In an embodiment, the first housing structure 1410 may include a first rotation support surface 1412, and the second housing structure 1420 may include a second rotation support surface 1422 corresponding to the first rotation support surface 1412. The first rotation support surface 1412 and the second rotation support surface 1422 may include curved surfaces corresponding to curved surfaces included in the hinge cover 1430.

In an embodiment, when the electronic device 13 is in an unfolded state (e.g., the electronic device of FIG. 13), the first rotation support surface 1412 and the second rotation support surface 1422 may cover the hinge cover 1430 such that the hinge cover 1430 may not be exposed through the rear surface of the electronic device 13 or may be minimally exposed. Meanwhile, when the electronic device 13 is in a folded state (e.g., the electronic device of FIG. 14), the first rotation support surface 1412 and the second rotation support surface 1422 may rotate along the curved surfaces included in the hinge cover 1430 such that the hinge cover 1430 may be maximally exposed through the rear surface of the electronic device 13.

Figure 16A:
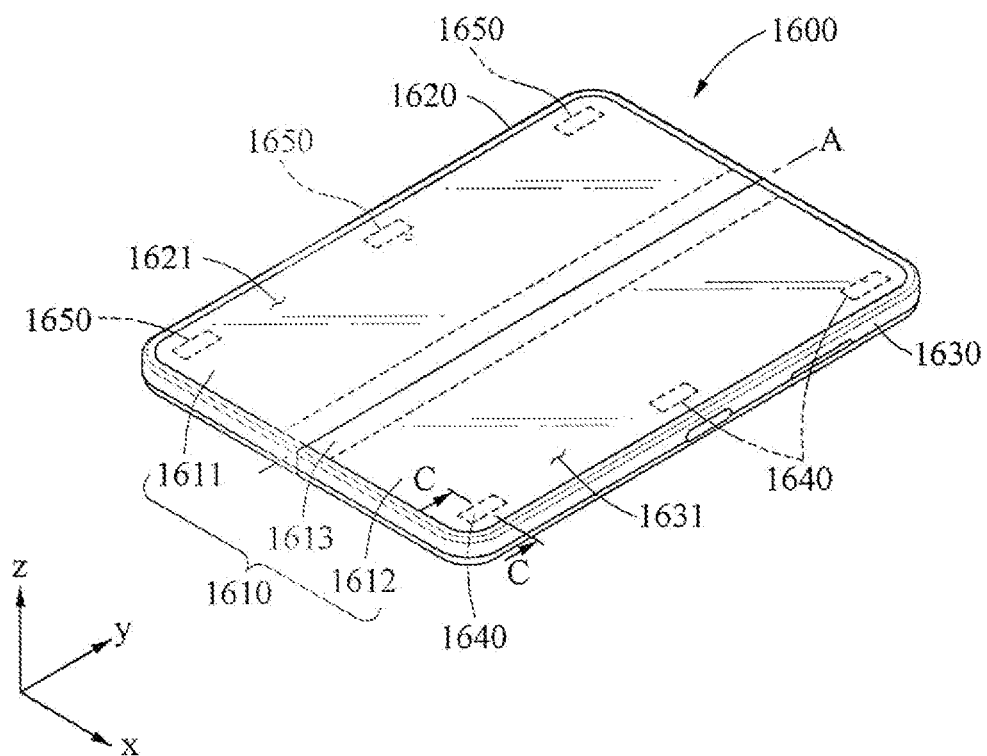
FIG. 16A is a perspective view illustrating an open state of an electronic device according to an embodiment.
Figure 16B:
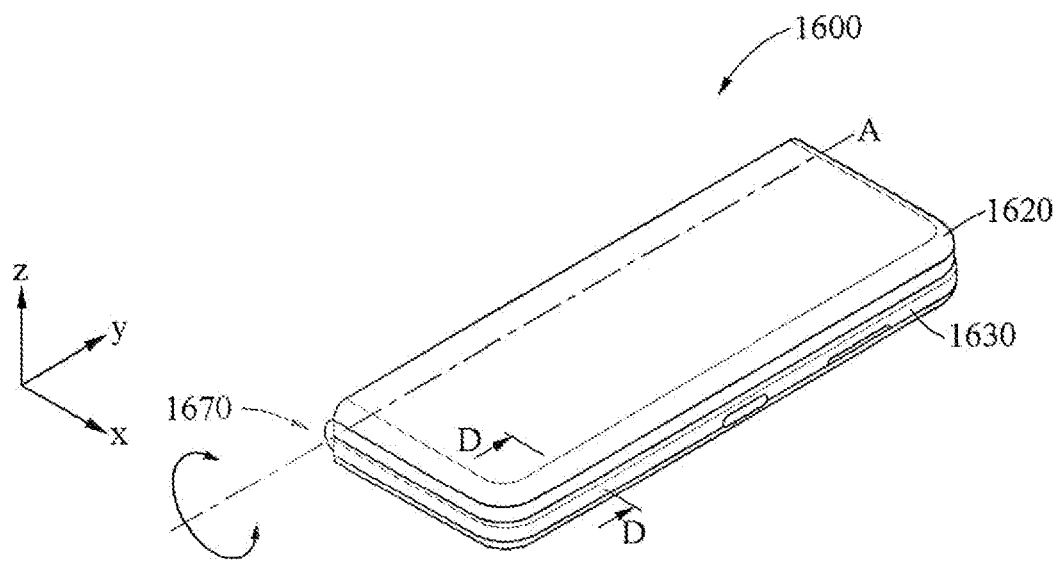
FIG. 16B is a perspective view illustrating a closed state of an electronic device according to an embodiment.
Figure 16C:
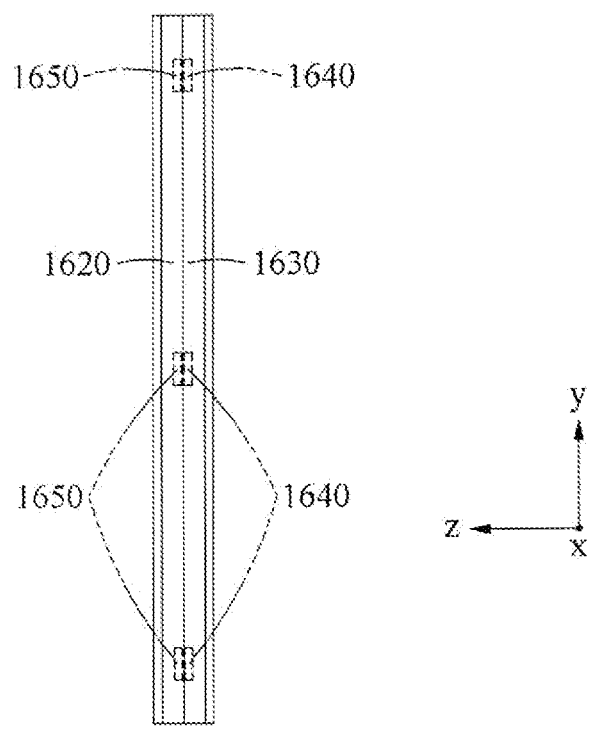
FIG. 16C is a view illustrating an arrangement of magnetic bodies in the closed state of FIG. 16B.
Figure 17A:
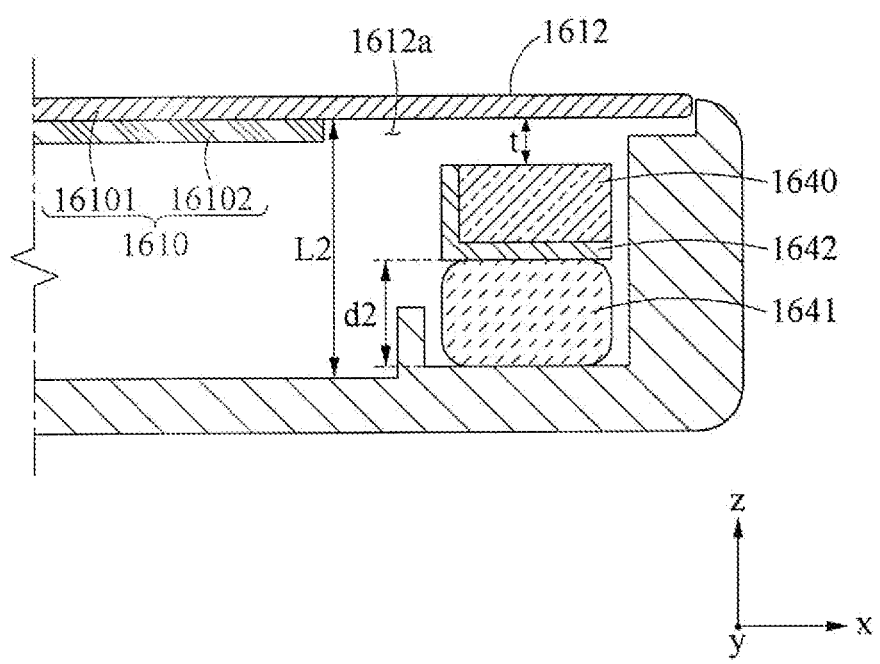
FIG. 17A is a cross-sectional view of the electronic device taken along a line C-C of FIG. 16A.
Figure 17B:
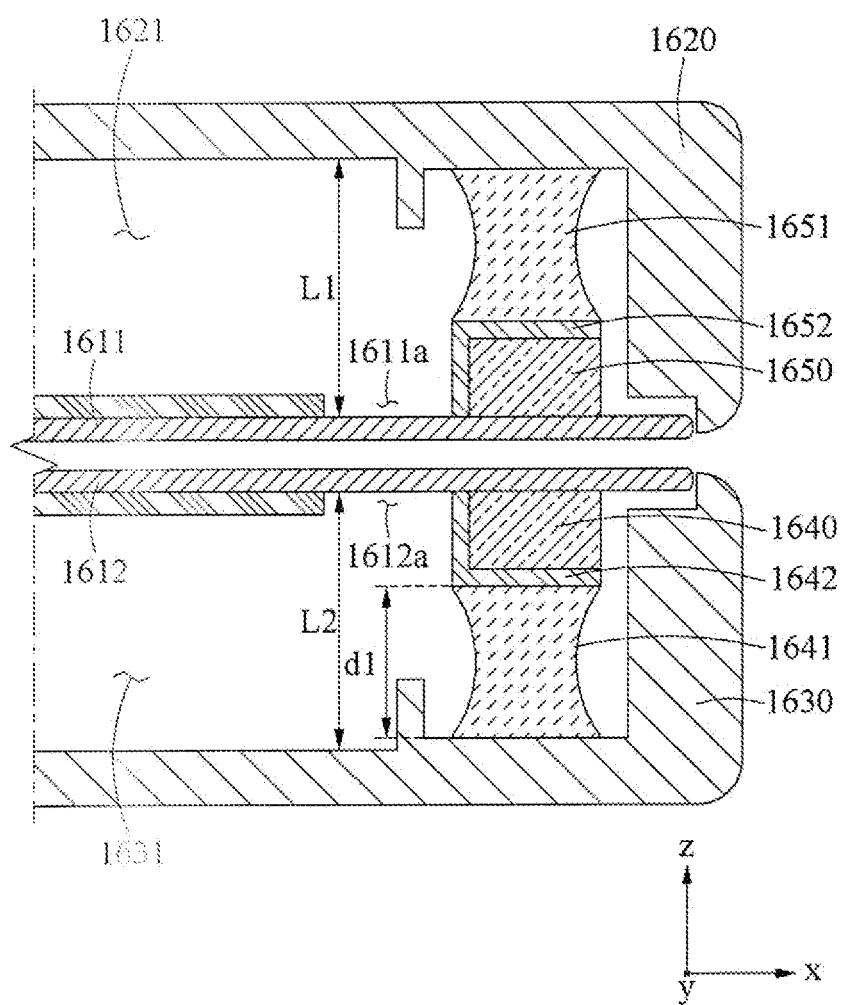
FIG. 17B is a cross-sectional view of the electronic device taken along a line D-D of FIG. 16B.

FIG. 16A is a perspective view illustrating an open state of an electronic device according to an embodiment, FIG. 16B is a perspective view illustrating a closed state of the electronic device according to an embodiment, FIG. 16C is a view illustrating an arrangement of magnetic bodies in the closed state of FIG. 16B, FIG. 17A is a cross-sectional view of the electronic device taken along a line C-C of FIG. 16A, and FIG. 17B is a cross-sectional view of the electronic device taken along a line D-D of FIG. 16B.

Referring to FIGS. 16A to 16C, an electronic device 1600 (e.g., the electronic device 101 of FIG. 1, the electronic device 13 of FIG. 13) may be deformed in shape according to a use state. For example, the electronic device 1600 may be provided in a foldable type that may be folded or unfolded according to the use state. The electronic device 1600 may include a display 1610 (e.g., the display 160 of FIG. 1), a first housing 1620, a second housing 1630, a hinge structure 1670, a first magnetic body 1650, a second magnetic body 1640, a first support, and a second support.

The display 1610 may display visual information to a user. In an embodiment, at least one area of the display 1610 may be deformed to a flat surface or a curved surface such that the display 1610 may be deformed in shape in response to a shape deformation of the electronic device 1600 (e.g., an opening/closing operation between an open state of FIG. 16A and a closed state of FIG. 16). In an embodiment, the display 1610 may include an axial area 1613 in which a folding axis A is positioned, a first area 1611 disposed on one side of the axial area 1613 (e.g., a left area of the axial area 1613 of FIG. 16A), and a second area 1612 disposed on the other side of the axial area 1613 (e.g., a right area of the axial area 1613 of FIG. 16A). In an embodiment, an overall shape of the display 1610 may be changed in response to the opening and/or closing operation of the electronic device 1600 as a relative angle between the first area 1611 and the second area 1612 is adjusted through the axial area 1613. For example, the display 1610 may be deformed in shape to be in a fully open state in which the first area 1611 and the second area 1612 form substantially the same plane (e.g., a fully open state of FIG. 16A), a closed state in which the first area 1611 and the second area 1612 substantially face each other (e.g., a closed state of FIG. 16B), or an intermediate open state in which the first area 1611 and the second area 1612 form a predetermined angle between the fully open state and the closed state. In an embodiment, the first area 1611 and the second area 1612 may be visually exposed to an outside in the fully open state or the intermediately open state, but may not be visually exposed to the outside as being disposed to face each other in the closed state. Hereinafter, for ease of description, a state in which the first area 1611 and the second area 1612 of the display 1610 are visually exposed to the outside as shown in FIG. 16A is referred to as an open state, and a state in which the first area 1611 and the second area 1612 of the display 1610 are not visually exposed to the outside as facing each other as shown in FIG. 16B is referred to as a closed state.

In an embodiment, the first area 1611 and the second area 1612 of the display 1610 may be generally symmetrical with respect to the axial area 1613. However, the areal division of the display 1610 herein may be provided as an example, and the display 1610 may be divided into a plurality of areas according to the functions and structure required for the electronic device 1600. For example, the areas of the display 1610 are illustrated in FIG. 16A as being divided based on the folding axis A or folding area parallel to the y-axis. However, in another embodiment, areas of the display 1610 may be divided based on another folding axis A (e.g., a folding axis A parallel to the x-axis) or another folding area (e.g., a folding area parallel to the x-axis).

In an embodiment, the display 1610 may include a display panel 16102 and a protective film 16101 for covering an outer surface of the display panel 16102. In an embodiment, the display 1610 may include bezel areas 1611a and 1612a in which the display panel 16102 is omitted. According to aspects of the disclosure, the bezel areas 1611a and 1612a may be formed in an area of the display 1610 adjacent to side surfaces of the housings 1620 and 1630. In an embodiment, the bezel areas 1611a and 1612a may include a first bezel area 1611a formed in the first area 1611 of the display 1610 and a second bezel area 1612a formed in the second area 1612 of the display 1610.

The first housing 1620 and the second housing 1630 may form an exterior of the electronic device 1600. In an embodiment, the first housing 1620 and the second housing 1630 may be connected to the hinge structure 1670 to form a rear surface of the electronic device 1600. The first housing 1620 and the second housing 1630 may each include a side surface for partially covering a front surface, a rear surface, and a space between the front surface and the rear surface, of the electronic device 1600. In this case, the front surface of the electronic device 1600 may be formed in a state in which most areas thereof are open such that the display 1610 may be exposed to the outside.

In an embodiment, the first housing 1620 and the second housing 1630 may each be connected to the rear surface of the display 1610. For example, the first housing 1620 may be connected to the rear surface of the first area 1611 and form a first space 1621 positioned on the rear surface of the first area 1611, and the second housing 1630 may be connected to the rear surface of the second area 1612 and form a second space 1631 positioned on the rear surface of the second area 1612. In an embodiment, the first space 1621 and the second space 1631 may form one space in which the display 1610 is seated through the coupling of the first housing 1620 and the second housing 1630.

The hinge structure 1640 may foldably connect the first housing 1620 and the second housing 1630. In an embodiment, the first housing 1620 and the second housing 1630 may rotate on the folding axis A by the hinge structure 1640. In this case, an angle between the first housing 1620 and the second housing 1630 may change according to the operation of using the electronic device 1600. In an embodiment, the display 1610 may be connected to the first housing 1620 and the second housing 1630 and thus, may move in response to the operation of folding and unfolding the first housing 1620 and the second housing 1630.

In an embodiment, in the open state of the electronic device 1600 (e.g., the fully open state of FIG. 16A), the first housing 1620 and the second housing 1630 may form an angle of substantially 180 degrees through the hinge structure 1670. The first area 1611 and the second area 1612 of the display 1610 may be disposed to face the same direction (e.g., the z-axis), thereby forming substantially the same plane. On the other hand, in an embodiment, in the closed state of the electronic device 1600 (e.g., the closed state of FIG. 16B), the first housing 1620 and the second housing 1630 may be disposed to face each other through the hinge structure 1670. In this case, the first area 1611 and the second area 1612 of the display 1610 may not be visually exposed to the outside by forming a narrow angle (e.g., in the range of 0 degrees to 10 degrees) to substantially face each other. In the closed state, the axial area 1613 may form a curved surface having a predetermined curvature. In an embodiment, when the electronic device 1600 is in an intermediate open state, the first housing 1620 and the second housing 1630 may be disposed to form a predetermined angle through the hinge structure 1670. The first area 1611 and the second area 1612 of the display 1610 may form an angle greater than that in the closed state and smaller than that in the fully open state. In the intermediate open state, the folding area may form a curved surface having a smaller curvature than in the closed state. In an embodiment, in the fully open state or the open state of the electronic device 1600, the first area 1611 and the second area 1612 of the display 1610 may be visually exposed to the outside. On the other hand, in the closed state of the electronic device 1600, the first area 1611 and the second area 1612 of the display 1610 may be disposed to face and cover each other, thereby not being visually exposed to the outside.

In an embodiment, the first magnetic body 1650 may be disposed in the first space 1621 in the first housing 1620 to face the rear surface of the first area 1611. The first magnetic body 1650 may be disposed in the first space 1621 such that an end portion thereof may face, that is, directly face the rear surface of the first area 1611. In an embodiment, the second magnetic body 1640 may be disposed in the second space 1631 in the second housing 1630 to face the rear surface of the second area 1612. The second magnetic body 1640 may be disposed in the second space 1631 so that an end portion thereof may face the rear surface of the second area 1612.

In an embodiment, the first magnetic body 1650 and the second magnetic body 1640 may be disposed at positions corresponding to each other so as to mutually apply a magnetic force in the closed state (e.g., the closed state of FIG. 16B). For example, the first magnetic body 1650 and the second magnetic body 1640 may be disposed at positions opposite to each other with the display 1610 interposed therebetween in the closed state of the electronic device 1600 as shown in FIG. 16C. In an embodiment, a plurality of first magnetic bodies 1650 and a plurality of second magnetic bodies 1640 may be disposed in the first housing 1620 and the second housing 1630, respectively. In this case, the plurality of first magnetic bodies 1650 and the plurality of second magnetic bodies 1640 may be disposed at positions corresponding to each other to mutually apply a magnetic force. For example, as shown in FIG. 16C, a straight line (e.g., the z-axis) perpendicular to the folding axis A may simultaneously pass through a first magnetic body 1650 and a second magnetic body 1640 that are disposed at positions corresponding to each other.

In an embodiment, the first magnetic body 1650 and the second magnetic body 1640 may be disposed adjacent to periphery areas of the first area 1611 and the second area 1612, respectively. For example, the first magnetic body 1650 and the second magnetic body 1640 may be disposed adjacent to side surface portions of the first housing 1620 and the second housing 1630 facing opposite sides of the folding axis A, as shown in FIG. 16A.

In an embodiment, the first magnetic body 1650 and the second magnetic body 1640 disposed at positions corresponding to each other may mutually apply a magnetic force in the closed state of the electronic device 1600. For example, the first magnetic body 1650 and the second magnetic body 1640 may be disposed to have opposite poles toward the first area 1611 and the second area 1612. In this case, in a state in which the first area 1611 and the second area 1612 of the electronic device 1600 face each other, the first magnetic body 1650 and the second magnetic body 1640 may mutually apply an attractive force with the display 1610 interposed therebetween. In an embodiment, the closer the distance between the first magnetic body 1650 and the second magnetic body 1640, the stronger the attractive force between the first magnetic body 1650 and the second magnetic body 1640. Thus, the first magnetic body 1650 and the second magnetic body 1640 may have the shortest distance in the closed state of the electronic device 1600 and mutually apply an attractive force at maximum.

In an embodiment, the first magnetic body 1650 may be disposed on a portion of the first area 1611 adjacent to the side surface of the first housing 1620, for example, on the rear surface of the first bezel area 1611a, and the second magnetic body 1640 may be disposed on a portion of the second area 1612 adjacent to the side surface of the second housing 1630, for example, on the rear surface of the second bezel area 1612a. In this case, a first shielding member 1652 and a second shielding member 1642 for blocking a magnetic force may be disposed on at least a portion of an outer surface of the first magnetic body 1650 and at least a portion of an outer surface of the second magnetic body 1640. The first shielding member 1652 and the second shielding member 1642 may block the magnetic force generated by the first magnetic body 1650 and the second magnetic body 1640 from being directed toward the display panel 16102.

Referring to FIGS. 17A and 17B, the first magnetic body 1650 and the second magnetic body 1640 according to an embodiment may adjust a distance from the rear surface of the display 1610 according to an operational state of the electronic device 1600, for example, the open state and the closed state.

In an embodiment, the first magnetic body 1650 may be supported by a first support 1651 in the first space 1621. The first support 1651 may be disposed in the first space 1621 to support the first magnetic body 1650, and change the length in a first connection direction (e.g., the −z-axial direction of FIG. 17B) toward the rear surface of the first area 1611. In an embodiment, the second magnetic body 1640 may be supported by a second support 1641 in the second space 1631. The second support 1641 may be disposed in the second space 1631 to support the second magnetic body 1640, and change the length in a second connection direction (e.g., the z-axial direction of FIG. 17B) toward the rear surface of the second area 1612. In an embodiment, the length of the first support 1651 in the first connection direction and the length of the second support 1641 in the second connection direction may each be adjusted by an external force acting thereon. For example, the first support 1651 and the second support 1641 may extend in response to an external force of pulling in the direction of the display 1610 acting thereon such that the length increases to a first length d1, and may be compressed in response to an external force of pushing in the direction of the display 1610 such that the length decreases to a second length d2. In an embodiment, a restoring force to return to the original state may act in response to the changes in the lengths in the first connection direction and the second connection direction, and thus, the first support 1651 and the second support 1641 may restore to the original lengths when the applied external force is removed. For example, the first support 1651 and the second support 1641 may be formed of a material that is compressible and capable of storing an elastic force according to compression. According to aspects of the disclosure, the first support 1651 and the second support 1641 may include a shape memory alloy, e.g., Nitinol or the like.

In an embodiment, the first support 1651 and the second support 1641 may cause the first magnetic body 1650 and the second magnetic body 1640 to be spaced apart from the rear surface of the display 1610 in the open state (e.g., the fully open state of FIG. 16A). In other words, in a state in which the first magnetic body 1650 and the second magnetic body 1640 do not mutually apply a magnetic force, for example, in the open state of the electronic device 1600 as shown in FIG. 17A, the first magnetic body 1650 and the second magnetic body 1640 may maintain the state of being spaced apart from the first area 1611 and the second area 1612 by the first support 1651 and the second support 1641.

In an embodiment, in the closed state (e.g., the closed state of FIG. 16B), the first support 1651 and the second support 1641 may cause the first magnetic body 1650 and the second magnetic body 1640 to contact the rear surface of the display. In an embodiment, in the process of closing the electronic device 1600, the distance between the first magnetic body 1650 and the second magnetic body 1640 may decrease, and the first magnetic body 1650 and the second magnetic body 1640 may apply an attractive force to pull each other toward the rear surface of the display. In this case, the first support 1651 and the second support 1641 may increase in the length in the first connection direction and the length in the second connection direction according to the attractive force acting between the first magnetic body 1650 and the second magnetic body 1640, and in the fully closed state of the electronic device 1600 as shown in FIG. 17B, the first magnetic body 1650 and the second magnetic body 1640 may contact the rear surface of the first area and the rear surface of the second area according to the increases in the lengths of the first support 1651 and the second support 1641. In an embodiment, the first support 1651 and the second support 1641 may apply an external force to the first magnetic body 1650 and the second magnetic body 1640 in a direction opposite to the display through the restoring force according to the increases in the lengths and thus, may pressure the display 1610 by a pressure lower than a set pressure in a state in which the first magnetic body 1650 and the second magnetic body 1640 contact the display.

In an embodiment, in the process in which the electronic device 1600 changes from the closed state to the open state, the relative distance between the first magnetic body 1650 and the second magnetic body 1640 may increase, weakening the attractive force mutually applied therebetween. In this case, the first support 1651 and the second support 1641 may return to the lengths in the open state through the restoring force, causing the first magnetic body 1650 and the second magnetic body 1640 to be spaced apart from the rear surface of the first area 1611 and the rear surface of the second area 1612, respectively.

According to various embodiments, an electronic device 400 includes: a first housing 410 including a first surface 410A and a side surface 410C; a second housing 420 including a first cover surface 420A and a second cover surface 420C, the second housing 420 connected to the first housing 410 for the electronic device 400 to be in an open state (e.g., the open state of FIG. 4A) in which the first surface 410A is visually exposed to an outside and a closed state (e.g., the closed state of FIG. 4B) in which the first cover surface 420A is disposed to substantially face the first surface 410A and visually occlude the first surface 410A; a display 411 exposed through the first surface 410A; a first magnetic body 430 disposed inside the first housing 410 to be positioned between the second surface 410C and the display 411; a second magnetic body 440 disposed between the first cover surface 420A and the second cover surface 420C to be positioned at a position corresponding to the first magnetic body 430 in the closed state; and a support 532 connecting the second surface 410C and the first magnetic body 430, the support 532 whose length in a connection direction from the second surface 410C to the first surface 410A changes, wherein the first magnetic body 430 may be disposed to face a rear surface of the display 411, and a distance from the first magnetic body 430 to the rear surface of the display 411 may be adjusted by the support 532.

In certain embodiments, in the open state, the support 532 may cause the first magnetic body 430 to be spaced apart from the rear surface of the display 411.

In certain embodiments, in the closed state, when an attractive force acts between the first magnetic body 430 and the second magnetic body 440, the length of the support 532 in the connection direction may increase such that the first magnetic body 430 may contact the rear surface of the display 411.

In certain embodiments, the support 532 may be formed of a compressible elastic material and may be biased toward an extended state.

In certain embodiments, the support 532 may include one or more hollows 6323 penetrating in a direction perpendicular to the connection direction.

In certain embodiments, the support 832 may include: a base 8321 disposed on the second surface 810C; a support plate 8323 spaced apart from the base 8321 in the connection direction and connected to the first magnetic body 830; and a connector 8322 connecting the base 8321 and the support plate 8323 such that a distance d between the base 8321 and the support plate 8323 may be adjusted.

In certain embodiments, the support 1232 may include a shape memory alloy whose length in the connection direction changes according to temperature.

In certain embodiments, based on the length in the connection direction, the support 1232 may have a first length d1 at a first temperature, and have a second length d2 longer than the first length d1 at a second temperature lower than the first temperature, wherein in a state in which the support 1232 has the second length d2, the first magnetic body 1230 may contact the rear surface of the display 1211.

In certain embodiments, the second housing 920 may further include a damper member 950 protruding outward from the first cover surface 920A to contact the display 911 in the closed state, wherein the second magnetic body 940 may be disposed inside the damper member 950.

In certain embodiments, the second housing 1020 may further include a pressing member 1160 disposed between the second cover surface 1120C and the damper member 1150 and configured to press the damper member 1150 in a direction of the first cover surface 1120A.

In certain embodiments, a plurality of first magnetic bodies 730A and 730B may be provided to overlap the display 711 in a state in which the first surface 710A is viewed, and a plurality of second magnetic bodies 740A and 740B may be provided at positions corresponding to the plurality of first magnetic bodies 730A and 730B, respectively, in the closed state.

In certain embodiments, at least one first magnetic body 730B of the plurality of first magnetic bodies 730A and 730B and at least one second magnetic body 740B of the plurality of second magnetic bodies 740A and 740B may be disposed at corresponding positions to apply a repulsive force to each other.

In certain embodiments, the second housing 420 may include a keyboard 421 disposed on the first cover surface 420A to be manipulated by a user.

In certain embodiments, the display 1610 may include a first area 1611 exposed through the first surface and a second area 1612 exposed through the first cover surface, and the second magnetic body 1640 may be disposed inside the second housing 1630 to face a rear surface of the second area 1612, and a distance from the second magnetic body 1640 to the second area 1612 may be adjusted according to a magnetic force acting thereon.

In certain embodiments, the electronic device 1600 may further include a second support 1630 connected to the second magnetic body 1640, the second support 1630 whose length in a second connection direction from the second cover surface to the first cover surface is adjusted, wherein the second support 1630 may cause the second magnetic body 1640 to be spaced apart from the rear surface of the second area 1612 in the open state, and cause the second magnetic body 1640 to contact the rear surface of the second area 1612 in the closed state.

According to certain embodiments, an electronic device 1600 includes: a display 1610 including a first area 1611 and a second area 1612; a first housing 1620 connected to a rear surface of the first area 1611 and forming a first space 1621; a second housing 1630 connected to a rear surface of the second area 1612 and forming a second space 1631; a hinge structure 1640 foldably or hingedly coupling the first housing 1620 and the second housing 1630, the hinge structure 1640 configured to cause the electronic device 1600 to be in an open state (e.g., the open state of FIG. 16A) in which the first area 1611 and the second area 1612 are visually exposed to an outside and a close state (e.g., the closed state of FIG. 16B) in which the first area 1611 and the second area 1612 substantially face each other; a first magnetic body 1650 disposed in the first space 1621 to face the rear surface of the first area 1611; a second magnetic body 1640 disposed in the second space 1631 to face the rear surface of the second area 1612; a first support 1651 disposed in the first space 1621 to support the first magnetic body 1650, the first support 1651 whose length in a first connection direction toward the first area 1611 changes; and a second support 1641 disposed in the second space 1631 to support the second magnetic body 1640, the second support 1641 whose length in a second connection direction toward the second area 1612 changes, wherein distances from the first magnetic body 1650 and the second magnetic body 1640 to a rear surface of the display 1610 may be adjusted by the first support 1651 and the second support 1641.

In certain embodiments, the first support 1651 and the second support 1641 may respectively cause the first magnetic body 1650 and the second magnetic body 1640 to be spaced apart from the rear surface of the display 1610 in the open state.

In certain embodiments, the first support 1651 and the second support 1641 may respectively cause the first magnetic body 1650 and the second magnetic body 1640 to contact the rear surface of the display 1610 in the closed state.

In certain embodiments, the first magnetic body 1650 and the second magnetic body 1640 may be disposed at opposite positions with the display 1610 interposed therebetween in the closed state, and the lengths of the first support 1651 and the second support 1641 may increase in a direction of the display 1610 in a state in which the first magnetic body 1650 and the second magnetic body 1640 mutually apply an attractive force.

In certain embodiments, the first support 1651 and the second support 1641 may include a compressible material.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

What is claimed is:

1. An electronic device, comprising:
   a first housing comprising a first surface and a second surface;
   a second housing comprising a first cover surface and a second cover surface, the second housing coupled to the first housing, the first housing and the second housing being movable relative to one another such that the electronic device is transitionable between an open state in which the first housing surface is visually exposed to an outside and a closed state in which the first cover surface is disposed to substantially face the first surface and visually occlude the first surface;
   a display exposed through the first surface;
   a first magnetic body disposed inside the first housing and is positioned between the second surface and the display;
   a second magnetic body disposed between the first cover surface and the second cover surface and is positioned at a position to effect magnetic coupling of the first magnetic body to the second magnetic body in the closed state; and
   a support coupling the second surface and the first magnetic body, the support having a length in a connection direction from the second surface to the first surface, the length being transitionable between a first length and a second length,
   wherein the first magnetic body is disposed to directly face a rear surface of the display with no separate structure between the first magnetic body and the display, and a distance from the first magnetic body to the rear surface of the display is adjusted by the support.

2. The electronic device of claim 1, wherein in the open state, the support causes the first magnetic body to be spaced apart from the rear surface of the display such that the first magnetic body is uncoupled from the rear surface of the display.

3. The electronic device of claim 2, wherein in the closed state, when an attractive force acts between the first magnetic body and the second magnetic body, the length of the support in the connection direction increases such that the first magnetic body contacts the rear surface of the display.

4. The electronic device of claim 1, wherein the support is formed of a compressible elastic material.

5. The electronic device of claim 4, wherein the support comprises one or more hollows penetrating in a direction perpendicular to the connection direction.

6. The electronic device of claim 1, wherein the support comprises:
   a base disposed on the second surface;
   a support plate spaced apart from the base in the connection direction and connected to the first magnetic body; and
   a connector connecting the base and the support plate such that a distance between the base and the support plate is adjusted.

7. The electronic device of claim 1, wherein the support comprises a shape memory alloy whose length in the connection direction changes according to temperature.

8. The electronic device of claim 7, wherein the support has a first length at a first temperature and has a second length longer than the first length at a second temperature lower than the first temperature, the first magnetic body contacting the rear surface of the display when the support is at the second length.

9. The electronic device of claim 1, wherein the second housing further comprises:
a damper member protruding outward from the first cover surface to contact the display in the closed state,
wherein the second magnetic body is disposed inside the damper member.

10. The electronic device of claim 9, further comprising:
a pressing member disposed inside the second housing and configured to press the damper member toward of the first cover surface.

11. The electronic device of claim 1, wherein
a plurality of first magnetic bodies overlap the display in a state in which the first surface is viewed, and
a plurality of second magnetic bodies are provided at positions corresponding to the plurality of first magnetic bodies, respectively, in the closed state such that the first plurality of first magnetic bodies are respectively coupled to the second plurality of second magnetic bodies.

12. The electronic device of claim 11, wherein at least one first magnetic body of the plurality of first magnetic bodies and at least one second magnetic body of the plurality of second magnetic bodies are disposed at corresponding positions to apply a repulsive force to each other.

13. The electronic device of claim 1, wherein the second housing comprises a keyboard disposed on the first cover surface.

14. The electronic device of claim 1, wherein
the display comprises a first area exposed through the first surface and a second area exposed through the first cover surface, and
the second magnetic body is disposed inside the second housing to face a rear surface of the second area, and a distance from the second magnetic body to the second area is adjusted according to a magnetic force acting thereon.

15. The electronic device of claim 14, further comprising:
a second support connected to the second magnetic body, the second support whose length in a second connection direction from the second cover surface to the first cover surface is adjusted,
wherein the second support causes the second magnetic body to be spaced apart from the rear surface of the second area in the open state, and causes the second magnetic body to contact the rear surface of the second area in the closed state.

16. An electronic device, comprising:
a display comprising a first area and a second area;
a first housing connected to a rear surface of the first area and forming a first space;
a second housing connected to a rear surface of the second area and forming a second space;
a hinge structure fordablyconnecting the first housing and the second housing, the hinge structure configured to cause the electronic device to be in an open state in which the first area and the second area are visually exposed to an outside and a close state in which the first area and the second area substantially face each other;
a first magnetic body disposed in the first space to directly face the rear surface of the first area with no separate structure between the first magnetic body and the rear surface of the first area;
a second magnetic body disposed in the second space to directly face the rear surface of the second area with no separate structure between the first magnetic body and the rear surface of the first area;
a first support disposed in the first space to support the first magnetic body, the first support whose length in a first connection direction toward the first area change; and
a second support disposed in the second space to support the second magnetic body, the second support whose length in a second connection direction toward the second area change,
wherein a distance between the first magnetic body and the second magnetic body to a rear surface of the display are adjusted by the first support and the second support.

17. The electronic device of claim 16, wherein the first support and the second support, respectively, cause the first magnetic body and the second magnetic body to be spaced apart from the rear surface of the display in the open state.

18. The electronic device of claim 17, wherein the first support and the second support, respectively, cause the first magnetic body and the second magnetic body to contact the rear surface of the display in the closed state.

19. The electronic device of claim 17, wherein
the first magnetic body and the second magnetic body are disposed at opposite positions with the display interposed therebetween in the closed state, and
the lengths of the first support and the second support, respectively, increase in a direction of the display in a state in which the first magnetic body and the second magnetic body mutually apply an attractive force.

20. The electronic device of claim 16, wherein the first support and the second support comprise a compressible material.

* * * * *